United States Patent [19]
Hermary et al.

[11] Patent Number: 5,986,745
[45] Date of Patent: *Nov. 16, 1999

[54] CO-PLANAR ELECTROMAGNETIC PROFILE SCANNER

[76] Inventors: Alexander Thomas Hermary, 8944 Harvie Road, Surrey, Canada, V4N 4B8; Terrance John Hermary, #206, 8450 Jellicoe Street, Vancouver, Canada, V5S 4S9

[ * ] Notice: This patent is subject to a terminal disclaimer.

[21] Appl. No.: 08/823,532

[22] Filed: Mar. 24, 1997

Related U.S. Application Data

[63] Continuation-in-part of application No. 08/346,392, Nov. 29, 1994, Pat. No. 5,615,003.

[51] Int. Cl.$^6$ .............................. G01B 11/24; G01C 7/00
[52] U.S. Cl. ........................ 356/3.03; 356/372; 382/106; 250/559.23
[58] Field of Search ................................... 356/376, 3.03, 356/3.06, 3.07; 250/559.22, 559.23; 382/106, 199

[56] References Cited

U.S. PATENT DOCUMENTS

| | | |
|---|---|---|
| Re. 32,984 | 7/1989 | Rosenfeld et al. . |
| 3,543,241 | 11/1970 | Leuck . |
| 3,617,707 | 11/1971 | Shields et al. . |
| 3,699,312 | 10/1972 | Jones et al. . |
| 3,761,685 | 9/1973 | Alpert et al. . |
| 3,866,052 | 2/1975 | Di Matteo et al. . |
| 4,188,544 | 2/1980 | Chasson . |
| 4,192,613 | 3/1980 | Hammar ........................ 356/376 X |
| 4,197,888 | 4/1980 | McGee et al. . |
| 4,613,234 | 9/1986 | Cruickshank . |
| 4,634,278 | 1/1987 | Ross et al. . |
| 4,645,348 | 2/1987 | Dewar et al. . |
| 4,648,717 | 3/1987 | Ross et al. . |
| 4,667,099 | 5/1987 | Arai et al. . |
| 4,687,325 | 8/1987 | Corby, Jr. . |
| 4,794,550 | 12/1988 | Greivenkamp, Jr. . |
| 4,846,577 | 7/1989 | Grindon . |
| 4,867,570 | 9/1989 | Sorimachi et al. ..................... 356/376 |
| 4,900,146 | 2/1990 | Penney et al. . |
| 4,937,445 | 6/1990 | Leong et al. . |
| 4,941,100 | 7/1990 | McFarlane et al. . |
| 5,041,726 | 8/1991 | Chang et al. . |
| 5,201,351 | 4/1993 | Hurdle, Jr. . |
| 5,307,151 | 4/1994 | Hof et al. . |
| 5,326,961 | 7/1994 | Sibata et al. . |

*Primary Examiner*—Pinchus M. Laufer
*Attorney, Agent, or Firm*—Barrigar & Moss; Robert H. Barrigar

[57] ABSTRACT

A co-planar system for determining the shape and dimensions of a surface of an object includes a projector for projecting in a selected plane onto the object a spatially coded pattern of radiation, e.g., light. The system also includes a receiving device capable of imaging the reflected pattern in the selected plane, and a discriminator for determining which portion of the reflected pattern corresponds to which portion of the projected pattern. By this means, a received signal representing less than the complete reflection from the projected pattern can be correlated with a discrete portion of the scanned object. The object is moved relative to the selected plane and the procedure repeated to obtain enough reliable data to generate a reasonably reliable surface profile. The resulting set of received signals and correlations are used to calculate the shape and dimensions of the object.

22 Claims, 13 Drawing Sheets

A - Raw signal received from charge coupled device.
B - Processed signal after being passed through a differentiator and a noise reduction filter.
C - Edge detector output signal - Spikes indicating edges of the marks and spaces of received pattern elements.

CO-PLANAR ELECTROMAGNETIC PROFILE SCANNER

This application is a continuation-in-part of U.S. Pat. No. 5,615,003 Ser. No. 08/346,392 filed on Nov. 29, 1994.

BACKGROUND OF THE INVENTION

This invention relates generally to a method and apparatus for the measurement of the dimensions of an object, and more particularly to a non-contact system to generate measurement data representative of planar sections of an object and contour maps of an object (which data may be used as an input to suitable process control apparatus), and to a spatially coded pattern for use with such system. The invention will be described primarily in connection with using electromagnetic radiation to obtain measurement data representing planar sections (profiles) of the external surfaces of logs so as to compute the three-dimensional surface profile of each individual log for the purpose of adjusting sawing equipment in saw mills (for example, to optimize the quantity or value of the lumber produced). However, the invention is also applicable to measurement of other objects, particularly where rapid and accurate shape determination is necessary. Such measurements may be made both as to objects' external surfaces and also as to internal interfaces (e.g. imaging and measurement of internal organs for medical purposes), the latter when suitable penetrating radiation is reflected from such internal interfaces and detectable (as reflected) by a suitable receiver. Further, the invention, while described as using electromagnetic radiation, is applicable to measurements using other forms of radiation, such as sound or particles, so long as reflection occurs from either an external or internal interface, and so long as a pattern divisible into distinguishable pattern elements as herein described may be applied to such radiation and detected by a suitable receiver.

The simplest non-contact automatic method commonly used to determine the shapes of logs is known in the prior art as shadow scanning. The log moves past a row of beams of light and the cross-sectional width of the log is determined by measuring the shadow cast by the log on an array of sensors on the other side of the log, which sensors are lined up with the projected light beams. Beams of light must be applied from several directions and sensed by a corresponding set of sensor arrays to obtain even a rough profile. The shadow method cannot measure or even detect concave features such as hole in the log. It measures the outer envelope of the profile of the log.

Other methods known in the prior art for determining the shape of an object without contact depend on the principle of triangulation, which has been known historically prior to the present century. The application of this principle can be illustrated by considering a single beam of light transmitted in a known direction in space from a known location at an object being measured. Some suitably selected form of receiving system positioned so as to view the object from a direction different from the direction at which the light was transmitted detects the direction from the receiving system at which the reflection from the projected light spot appears on the object being measured. The distance between the transmitter and the receiver is known and fixed. Hence two angles (determined from the transmitting and receiving directions) and one side of a triangle (the distance between the transmitter and the receiver) are determined, and thus the location of the spot on the object relative to the measuring apparatus is easily calculated.

To use triangulation to measure the shape of an object (rather than merely to measure the coordinates of a single point), many spots in a raster pattern or the like would have to be determined. This could be done by projecting a pattern of beams simultaneously, by sweeping one beam over the surface of the object in a suitable scanning pattern in a continuous motion, or by projecting a sequence of beams, one at a time, at different points on the object being measured (this technique is often referred to as "time multiplexing"). Simultaneous projection, as taught by the prior art, is not able to reliably measure irregular surfaces because identification of a particular spot with a particular transmitted beam becomes uncertain or ambiguous if any spots are obscured. In some cases, the ambiguity or uncertainty could be overcome by the use of a reference spot whose coordinates are known, thereby enabling the operator to establish a correspondence between at least one transmitted beam and one detected spot. However, ambiguity or uncertainty would remain a problem for other spots in the pattern, even if the reference spot were located unambiguously, as identification of spots other than the reference spot depends on the assumption that no spots between the reference spot and the spots to be identified are obscured. While beam sweeping and time multiplexing do not entail the foregoing ambiguity problem, both are subject to the problem that the accurate instantaneous measurement of the profile of an object such as a log moving rapidly is difficult, by reason of the need for adequate computing time required to determine each profile. For example, in a typical saw mill, logs move at 500 feet per minute, so that to obtain profiles of, say, 1" apart (axially) on the log requires that each scan take less than 10 milliseconds.

An alternative surface profile measurement apparatus taught in Leong, U.S. Pat. No. 4,937,445, granted on Jun. 26, 1990, that is alleged to achieve unique identification of detected spots with transmitted beams, uses a small number of beams, so that within a limited depth of range, the spot from each beam will be observed within a limited region on the imaging device. However, this implies that increasing the number of beams to increase resolution of surface features decreases the range of depths that can be measured. Further, accurate knowledge of the direction of each beam in the Leong technique is critical, making frequent calibration necessary.

An alternative taught in Corby, U.S. Pat. No. 4,687,325, granted on Aug. 18, 1987, is to project onto the scanned object a time-separated series of different complete-scan patterns of beams so that identification of the pattern of spots on the scanned object can be used to identify beams uniquely with detected spots. Triangulation is used to obtain the spatial coordinates of the spots. Corby requires the sequential projection of a series of mutually differing patterns of beams, and so suffers from the same problem from which beam sweeping and time multiplexing suffer, namely the inability to determine the instantaneous profile of a rapidly moving object. Furthermore, complexity arises in Corby from the need to transmit a plurality of different patterns in time sequence.

For the foregoing reasons, it can be readily understood that the problem of measuring at a distance the surface profiles of irregular objects moving rapidly along a production line (say) is not solved satisfactorily by the known art. A satisfactory measuring apparatus should:

(a) have either (i) the capability to make very fast (snapshot) measurements of the profile of the object so that as the object moves past the measuring apparatus, the surface contour of the entire object can be built up as a series of profiles; or (ii) the capability to make a measurement of the entire surface contour of the object at one time;

(b) have the ability to cope with failure to receive portions of the transmitted pattern (due to irregularity of surface features of the object or to the occlusion of portions of the object by intervening spurious objects);

(c) be compact and rugged with a minimum of moving parts;

(d) be relatively immune to interference from ambient lighting;

(e) require only a narrow space in the environment surrounding production line apparatus to obtain sufficient view of the object being measured to accurately measure the object;

(f) not require frequent calibration; and (e) have sufficient resolution and depth of field to measure accurately irregular objects such as logs.

The prior art teaches that a multiplicity of discrete beams (a pattern) projected simultaneously onto the object to be measured from different angles is needed to satisfy the requirements set out above for the rapid measurement of the complete surface profile of the object. However, the beam patterns taught in the prior art are not satisfactory as they do not enable reliable measurements to be made in situations that can occur in a sawmill and in other scanning situations, namely that the received signal may not represent the entirety of the transmitted scanning beam. There are various reasons why this may happen. The log may be smaller than the transmitted scanning beam. Irregularities on the surface of the object being scanned (e.g., bumps on the log) may occlude a portion of the log's surface such that the scanning beam does not reach the surface in question, or the bump may occlude the light reflected from the portion in question. Further, a log is carried by a conveyor, and sometimes the scan intersects a portion of the conveyor instead of the log, the log's surface being occluded by such conveyor portion. Consequently, the reflected light signal may be unreliable; portions of it may have to be rejected. Furthermore, if only a portion of the total scanned beam is received reliably by the detector, it may not readily be possible (within the teaching of the prior art) to correlate the received portion with any particular part of the log or other object being scanned. If the received signal cannot reliably be correlated with a particular portion of the object being scanned, then the received signal may be useless to the purpose at hand.

SUMMARY OF THE INVENTION

The present invention, like some other prior inventions, makes use of the concept of structured light or other radiation. According to this concept, a detector is able to identify the point of change from, for example, transparency to opacity, from brightness to darkness, from one color (wavelength) to another, or from one polarization to another, in accordance with the nature of the detector. If brightness to darkness is used, a suitable structured light pattern is projected onto the object to be measured so that these light-to-dark and dark-to-light transition points may be identified. According to the present invention, the pattern of structured light (or other radiation) is coded such that discretely and uniquely identifiable sub-patterns exist that can be correlated with corresponding portions of the transmitted pattern, and thus with corresponding portions of the object being scanned. This requires that the beam of light, or other radiation that is projected onto the object being scanned, be patterned and coded in such a manner that sub-patterns (subsets of the pattern) above some predetermined size can be uniquely identified and associated with a specific portion of the scanning beam, and thus with the object being scanned.

In one aspect, the invention provides a projector for projecting in a plane perpendicular to the direction of motion of the object being scanned a pre-determined coded pattern of radiation onto a scanned object. For log scanning applications, the radiation is preferably light. Light or other chosen radiation reflected from the scanned object is detected in the same plane and processed by a detector in the nature of an imaging device per se known in the technology, so as to generate a useful output signal representing the reflected radiation. Preferably the analog signal thus obtained is converted to a digital signal for further processing. The principle of triangulation is used to obtain the coordinates of points on the object being scanned relative to the projector or detector. The resulting data can be further analyzed and processed according to known techniques to obtain a useful technical or industrial result. For example, profile information concerning the shape and dimensions of a log may be used to control a saw and edgers in a sawmill to cut the maximum number of boards of predetermined cross-sectional dimensions from the log, boards with the maximum value, or boards with dimensions specially ordered by a customer.

Because scanning and detection apparatus according to the invention makes use of the well-known principle of triangulation to obtain reliable distance information relative to the object being scanned, and because apparatus according to the invention makes use in part of a combination of devices that are per se known in the technology, such devices will accordingly not be described in detail in this specification.

Apparatus constructed in accordance with the invention need not include any mechanical moving parts for projecting the scanning beams or for receiving and detecting the reflected signal. The inventive apparatus reliably correlates the received signal corresponding to only a portion of the projected scanning beam (such portion being greater in size than some predetermined minimum that depends upon the characteristics of the projected beam in conjunction with a preselected spatially coded pattern, as will be described further below) with a counterpart portion of the projected beam, so that useful profile information is obtained about the object being scanned, even though such information may relate to only part of the scanned object. If enough useful information is obtained on a partial scan basis over a sufficient scanning area, then there may be enough information obtained in total by combining the useful information for any given scan with the useful information obtained from other scans that the entirety of the profile of the scanned object may be reliably ascertained.

The predetermined coded pattern used in apparatus according to the invention is selected so that for any given scan, the smallest useful portion of the projected scanning beam is characterized by an array of discernible pattern elements that enable any one such smallest useful portion to be distinguished from any other smallest useful portion. Accordingly, if only a relatively small portion of the reflected signal is useful, then if that signal is characterized by an array of pattern elements that correspond uniquely to an array of pattern elements of a portion of the projected signal at least as large as the smallest useful portion thereof, it follows that the reflected signal data can also be correlated uniquely with an identifiable discrete portion of the scanned object.

The significant advantage of the invention is thus that if the reflected signal detected by the detector corresponds to only a portion of the projected scanning beam (or matrix), then that reflection signal information can nevertheless be processed to obtain reliable profile information about an identifiable portion of the object being scanned. This is possible according to the invention because of the use of a suitable coded pattern having uniquely identifiable divisions. The projected beam strikes or scans the object with the pattern characteristics superimposed, and consequently the pattern as projected onto and reflected from the scanned object will also be capable of recognition in the reflected signal. The character of the pattern will vary depending upon whether a one-dimensional scan (obtaining profile information in two dimensions along the intersection of a plane with the surface of the object scanned) or a scanning matrix in two dimensions (obtaining three dimensional profile information of the object scanned) is used, and depending upon a number of other parameters to be given due consideration by the system designer, including the resolution of the projected pattern on the surface of the scanned object, the overall size of the object being scanned, the resolution capability of the detector, an assessment of the smallest portion of the scanned object about which any profile information will be considered useful, the general expected shape of the object being scanned, and the industrial or technical purpose to which the profile information is to be put.

If a given scan yields two or more subgroups of received pattern data that are correlatable with two or more identifiable portions of the scanned object, then the spatial coordinates of those two or more identifiable portions may be determined.

To give two examples that illustrate the distinctions between two different possible applications of the present invention, consider the scan of a log in a sawmill on the one hand, as against the scan of a small fossil or artifact by an archaeologist, on the other hand. In the one case, the sawmill operator wishes to obtain the largest possible number of board feet of lumber of certain cross-sectional dimensions (say), and in the other instance, the archaeologist wants to obtain a non-contact surface profile of the fossil (say) so as to be able to reproduce it exactly for study purposes, without damaging the original. It is immediately evident that the parameters and factors to be considered, including those mentioned in the preceding paragraph, will be different from one another in these two different possible applications of the invention. Of course, in each case, other factors unrelated to the present invention may enter into the decision making—for example, the final decision as to the cutting of a log may depend upon an assessment of where the knots are as well as upon the exterior profile of the log, but that consideration in the decision-making process is entirely irrelevant to the present invention, which is concerned with profile characteristics only. (Of course, given satisfactory resolution, the profiler of the present invention can help to identify the probable surface location of knots on the log.)

In a simple one-dimensional scanning beam yielding two-dimensional profile information along the intersection of a plane with the surface of the object being scanned, the scanning pattern may resemble, for example, a bar code of the sort applied to goods in a grocery for price identification. Just as the varying light and dark patterns in a bar code represent uniquely determinable numeric information as one proceeds from one end of the bar code pattern to the other, so a structured light pattern according to the invention corresponds to uniquely identifiable subsets of useful spatial information. Each subset of detected reflected radiation corresponds to a uniquely and discretely identifiable portion of the projected scanning beam, and thus to a uniquely and discretely identifiable portion of the object being scanned.

If the scanning beam is projected not as a linear one-dimensional scanning beam yielding two-dimensional contour line information about the object being scanned, but instead is projected as a two-dimensional matrix (the matrix could be, for example, Cartesian or polar in character), then the pattern of light-to-dark transitions (say) may be rather more elaborate than a simple bar code, and may conform to a wide variety of two-dimensional configurations. For example, a possible two-dimensional pattern might comprise selected letters of the alphabet distributed over a plane. The character, number, and relative sizes of the elements in the pattern will depend in part upon the factors previously mentioned, e.g., the expected general character of the profile of the object being scanned, its expected size, the resolution of the pattern as projected on the object, the resolution of the detector, the industrial or technical application of the distance data obtained, etc.

An example of the use of the invention to determine the coordinates of the intersection of a plane with the surface of an object, i.e., the contour line of the object in that plane, will be discussed first. Such plane will include the projected beam of structured light (say) having a suitable coded pattern. The use of the invention according to this example to determine the coordinates of the entire surface of a three dimensional object is a straightforward extension, involving projection and detection of a spatially separated sequence of beams over the length of the object, thereby generating a corresponding series of contour line profiles.

To determine a contour line of the object being scanned, the projector of the invention projects a spatially coded pattern of light (say) in a narrow strip across the object. For example, one possible such pattern is a series of light and dark bands (created by alternating transparent and opaque regions of a strip of material through which the transmitted beam is to be projected) running generally perpendicular to the direction of projection of the narrow strip and in which the dark-to-light (opaque-to-transparent) transitions are regularly spaced while the light-to-dark (transparent-to-opaque) transitions (say) are irregularly spaced according to a predetermined pattern, thereby generating discretely identifiable subsets of the pattern. (Either set of transitions could be regularly spaced, so as to identify the boundaries of the pattern elements, whilst the other set is spaced in accordance with the coding applied to the pattern.)

The reflection of the pattern is detected and compared to the projected pattern to determine a one-to-one correspondence between the features of the projected pattern and the reflected pattern. To this end, analysis of subsets of pattern elements of the received pattern data, such subsets selected to be above a certain size in the linear dimension along the strip, affords a means for discriminating between such subsets. This analysis is possible even if only a portion of the projected pattern (above some predetermined minimum size) is received, because the subsets of the pattern as received can be discriminated from one another, leading to a reliable identification of the corresponding portion of the object being illuminated.

One way to obtain the correspondence between a subset of the reflection signal data and the projected pattern is perform a suitable fitting routine on the data. A convolution routine revealing a fit for a given maximum sum result could be used, but the inventors have found that the use of a "least squares" fitting procedure provides satisfactory results. Once this fitting step is done, the coordinates of a point on the surface of the object at which a particular feature of the pattern is seen are determined (using ordinary principles of triangulation) from the distance between the projecting and observing locations and the orientation of the projecting and observing apparatus. If more than one projector/detector pair is used, each functioning through a selected angular range of view, the entire cross-section of the object can theoretically be measured, although in practice at least three and sometimes four or more such pairs operating from several directions about the scanned object, are typically employed in a given application so as to afford complete three-dimensional information about the scanned object. If the object is moved past the projector or the projector is moved past the object, then a three-dimensional image of the object can be generated by combining the results of individual two-dimensional profile data taken at a series of scans along the length of the object.

The invention is thus seen to include as a primary distinguishing feature, use of a spatially coded pattern in apparatus of the foregoing type to allow the determination of a one-to-one correspondence between projected and observed features of the pattern. There are two aspects to this feature. The first aspect is the use of the spatial coding scheme for the projected beam of light (or other radiation), which enables any small portion of the projected pattern to be identified uniquely and distinguished from any other small portion above some predetermined size. The second aspect is the use of the spatial coding to determine a correspondence between a portion of the pattern projected and a corresponding portion of the pattern observed, thereby permitting useful information to be obtained about the shape of that part of the object to which the corresponding portions of the pattern apply, even if information for the complete scan (i.e., complete projected pattern) is not available.

What is not part of the invention is the choice of mechanism for projecting the coded pattern of light or other radiation (although the coded pattern is part of the invention), the choice of apparatus for obtaining an image of the object illuminated in the pattern of radiation, the choice of apparatus for digitizing the image and comparing it electronically to the known pattern being projected, the choice of means for calculating the coordinates of projected features of the coded pattern on the surface of the object (if this is desired), the choice of means for displaying a cross-sectional representation of the object, nor the choice of means for providing data pertaining to that display to other equipment for further or other processing. Suitable projectors, imagers, triangulation calculation routines, monitors, and related software, etc. are already known per se and available in the industry for such purposes.

DETAILED DESCRIPTION OF THE INVENTION

To provide a comprehensive disclosure without unduly lengthening this specification, applicants incorporate by reference the disclosure of U.S. Pat. No. 5,615,003. However, for the convenience of the reader portions of the description of the embodiment described in U.S. Pat. No. 5,615,003 are repeated in addition to describing in detail the co-planar aspects of the preferred embodiment of the optical co-planar variant of the invention.

Figure 1:
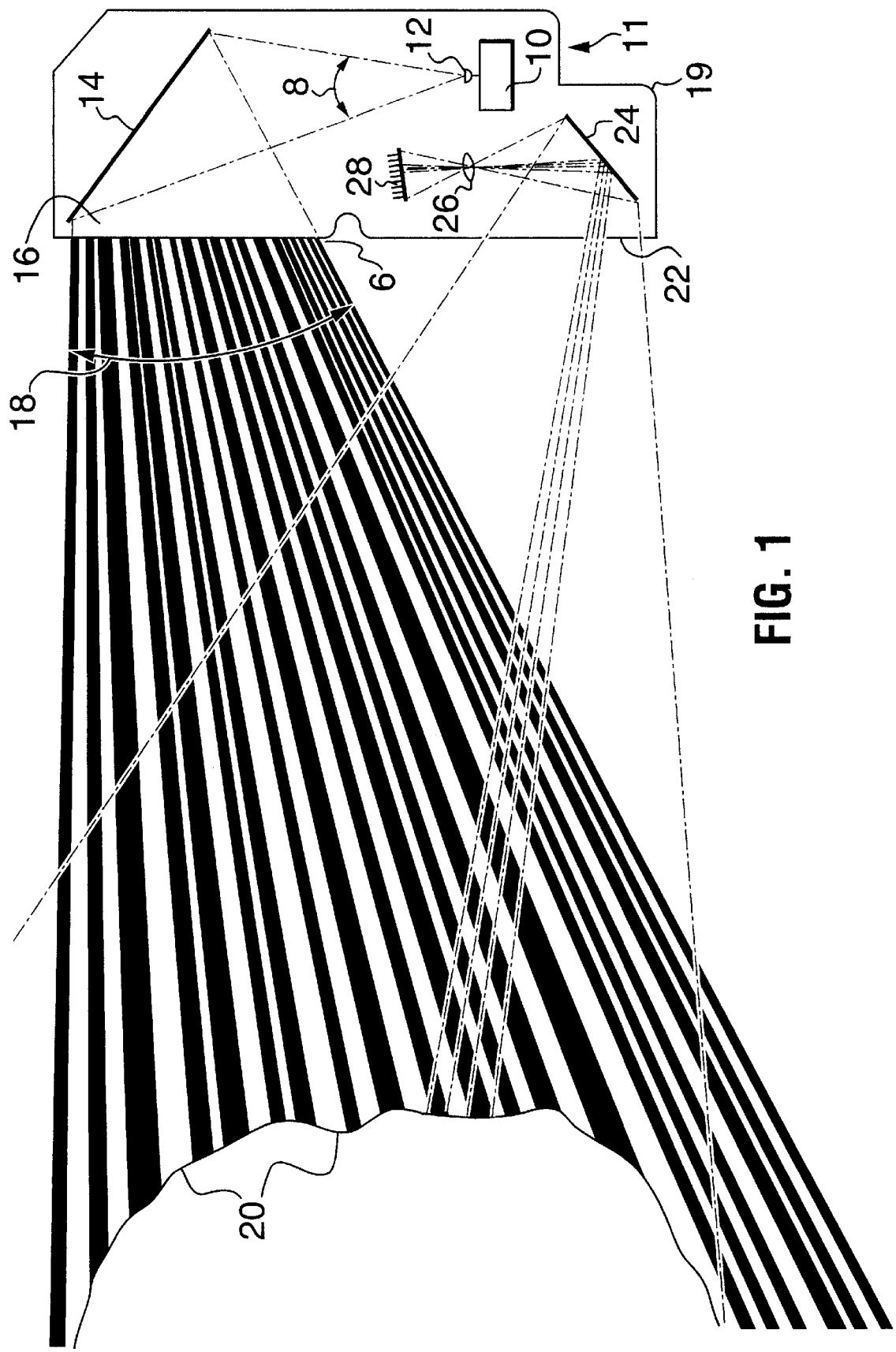
FIG. 1 is a schematic plan view of a first embodiment of electromagnetic profile scanning and detection apparatus according to the invention.

A preferred embodiment of the optical co-planar variant of an electromagnetic profile scanner according to the invention is shown in schematic form in FIG. 1 and generally referred to by reference numeral 11. The profile scanner 11 is suitable for use in scanning the surface of an object, such as a log 20, moving through the plane of a coded scanning beam 18. In a saw mill, the log 20 would be carried through the coded scanning beam 18 by a log transport apparatus 110 shown schematically in FIGS. 11A and 14. A log transport apparatus 110 is typically comprised of a step-chain conveyor 113 with flights 111 mounted every two to three feet along the step-chain conveyor 113. Each flight 111 resembles a pair of stairs climbing away from the centre line 130 of the step-chain conveyor 113. The log 20 is supported from below by the corners of the "stairs" of the flights. The base of each flight 111 is approximately 1" to 2" thick and therefore blocks the view of a portion of the log 20 from below. The "stairs" of each flight 111 are generally approximately ½" to ⅝" thick and therefore block the view of a portion of the log 20 from the sides.

Herein the phrase "in a plane" and variants thereof shall mean occupying a minimal space in a direction perpendicular to the referenced plane. In other words, when an object is referred to as being "in a plane", the object shall be taken to have a finite thickness in the direction perpendicular to the plane and shall not be construed as being a two-dimensional object in the referenced plane. For example, when the scanner 11 is described as in a plane, it is not meant that the scanner 11 is in a single geometric plane having no thickness, but rather that the scanner 11 has a finite but minimal thickness in the direction perpendicular to the plane.

Where a coordinate system is referred to herein, the z direction shall be taken as the direction of motion a log carried by the log transport apparatus 110 and the xy coordinates shall be mutually perpendicular directions each perpendicular to the z direction.

The profile scanner 11 is "co-planar" in that both the projected coded scanning beam 18 and the received image of the scanning beam 18 formed upon image sensor 28 are in the same plane.

The co-planar aspect of the preferred embodiment of the invention shown in FIG. 1 is highly desirable in a scanner that must operate in the confined space available in a typical saw mill. FIGS. 12A, 12B, 13A, and 13B illustrate the advantages of a co-planar scanner, indicated generally by numeral 152 in FIGS. 13A/B, over a conventional sheet-of-light profile scanner, indicated generally by numeral 140 in FIGS. 12A/B. An example of a sheet-of-light scanner is found in U.S. Pat. No. 4,188,544.

In the conventional sheet-of-light profile scanner 140 a sheet or plane of light, a portion of which is indicated by numeral 148, is projected from a laser projector 142 onto the surface of the log 20. The reflection of the sheet of light 148 from the surface of the log 20 is seen as a curved line 151 on the surface of the log 20 from an upstream or downstream position by a two-dimensional camera 144 having a lens 146. The laser reference plane 148 is typically oriented normal to the axis of the log transport apparatus (the z direction) so that the scanner 140 will report points of the curved line 151 in xy coordinates. The image formed in the camera 144 is processed by decomposition into a series of illuminated pixels. Each pixel position in the image is translated into a discrete line in three-dimensional space passing through that pixel and the center of the imaging lens 146. The coordinates of a given point in the curved line 151 on the surface of the log 20 is determined by calculating the intersection of the laser reference plane 148 with the line through the center of the imaging lens 146 and the corresponding illuminated pixel. The series of pixels reported by the camera 144 is translated into a corresponding series of points representing the line 151 on the surface of the log 20 intersected by the reference plane 148. To work properly the camera 144 must be placed upstream or downstream of the reference plane 148 and must have an unobstructed view of the intersection of the surface of the log 20 intersected by the reference plane 148.

Figure 13A:
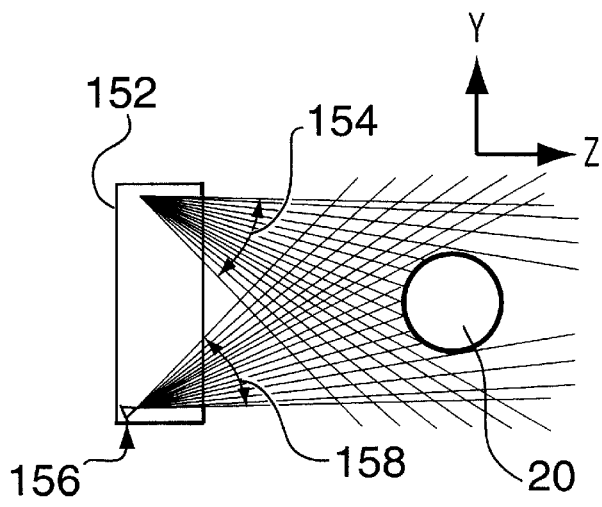
FIGS. 13A and 13B are, respectively, schematic end and side elevation views of a co-planar profile scanner.
Figure 13B:
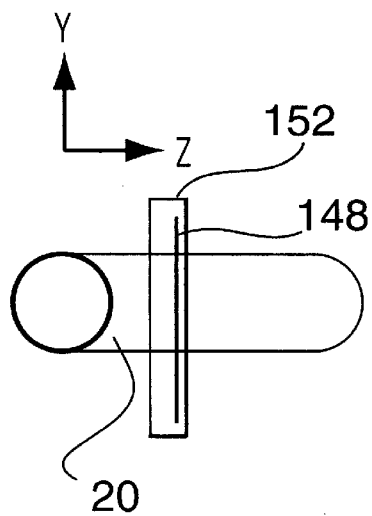

One form of co-planar scanner 152, illustrated schematically in FIGS. 13A/B, uses an array of laser reference beams 154 arranged in a plane 148. In the same plane 148 a linear imaging system 156 is positioned to image the reflections of the laser reference beams 154 inside a predetermined scan zone 158. The z-direction is indicated in FIG. 13B and is perpendicular to the plane of FIG. 13A and plane 148.

Co-planar scanner 152 does not have any optical components offset in the z direction, thus it does not require any significant physical space in the z direction. Also, because the imaging sensor 156 is a linear array its field of view is a line, as opposed to a two-dimensional array which has a rectangular field of view as is the case for the camera 144 used in the sheet-of-light profile scanner 140. There are other significant differences between a co-planar scanner 152 and a sheet-of-light profile scanner 140. The co-planar scanner 152 views a narrow strip directly across from itself, whereas a sheet-of-light profile scanner 140 views a large area either upstream or downstream making it more difficult to shield from plant lighting. It is important that neither type of scanner directly view plant lights. If a light is seen by a scanner's camera it must be shielded. One of the key benefits of a 3-dimensional profile scanner such as sheet-of-light profile scanner 140 or a co-planar scanner 152 is the ability to see the entire log surface. This requires a unobstructed view of all surfaces, which is easily achieved on the top and sides of the log, but more difficult for the bottom surface. A co-planar scanner 152 requires a narrow gap in the bed of the log transport apparatus to measure the underside of a log and is obstructed only when a flight covers the gap. Because sheet-of-light scanners view the log at a significant z offset, either upstream or downstream, a sheet-of-light scanner viewing the bottom of the log requires that a triangular section of the bed of the log transport apparatus be removed. The camera field of view is obstructed by the flight as it approaches the laser plane, not only when each flight covers the laser plane. Space requirements for a co-planar scanner are minimal, typically a few inches in the longitudinal direction of the motion of the log, whereas sheet of light scanners require substantial space in the z direction to achieve reasonable triangulation.

Preferably, the longitudinal (axial) extension of the moving log 20 generally perpendicular to the plane of the coded scanning beam 18. It is desirable that the profile scanner 11 be placed relatively close to the scanned object so that the resolution of the coded pattern on the scanned object is sufficiently high. For example, the profile scanner 11 might be located from about 16 to 30 inches from the log 20 being scanned. The profile scanner 11 of FIG. 1 makes a series of scans each generally perpendicular to the axis of the scanned log 20. As the log 20 moves past the profile scanner 11, the entire surface profile of the log 20 within the scanning beam is scanned (as a series of line profiles). This can be accomplished by having the projector (e.g. laser source 10) of the profiler 11 project the beam 18 continuously onto the log 20 as it moves past the profiler, and having the receiver (e.g. image sensor 28) take a series of sequential "snapshots" of the reflected light pattern of the log 20 as sequential surface area portions of the log 20 come within the viewing angle of image sensor 28.

Figure 10:
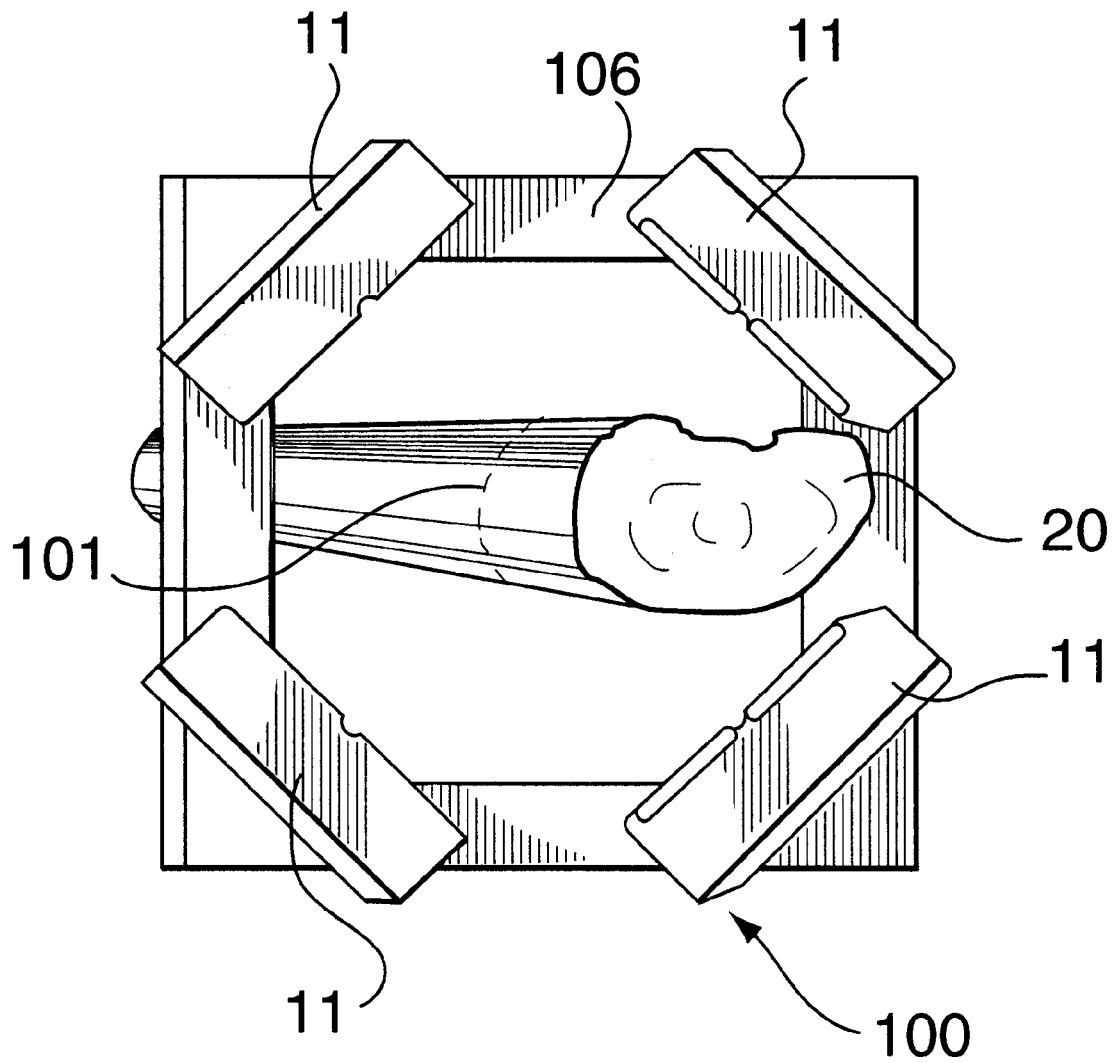
FIG. 10 is a schematic perspective view of the preferred embodiment of a profile scanner comprised of an array of co-planar profile scanner heads scanning a log.

In a saw mill it is desirable to use at least three and preferably four or more profile scanners 11 each of which is referred to herein as a scanner head 11. Each scanner head 11 projects a discrete beam 18 in the same plane from a discrete direction so as to simultaneously scan the intersection of the plane of the projected beams 18 with the surface of the log 20. In the preferred arrangement, illustrated in FIG. 10, an array 100 of four scanner heads 11 is mounted in a single plane in a frame 106 surrounding path of the moving log 20. Each scanner head 11 projects a discrete coded scanning beam 18 onto a portion of the intersection 101 with the log 20 of the plane in which the scanners 11 are mounted. By combining the series of line profiles obtained by the four scanner heads 11 a complete surface profile of the log 20 may be obtained.

Figure 14:
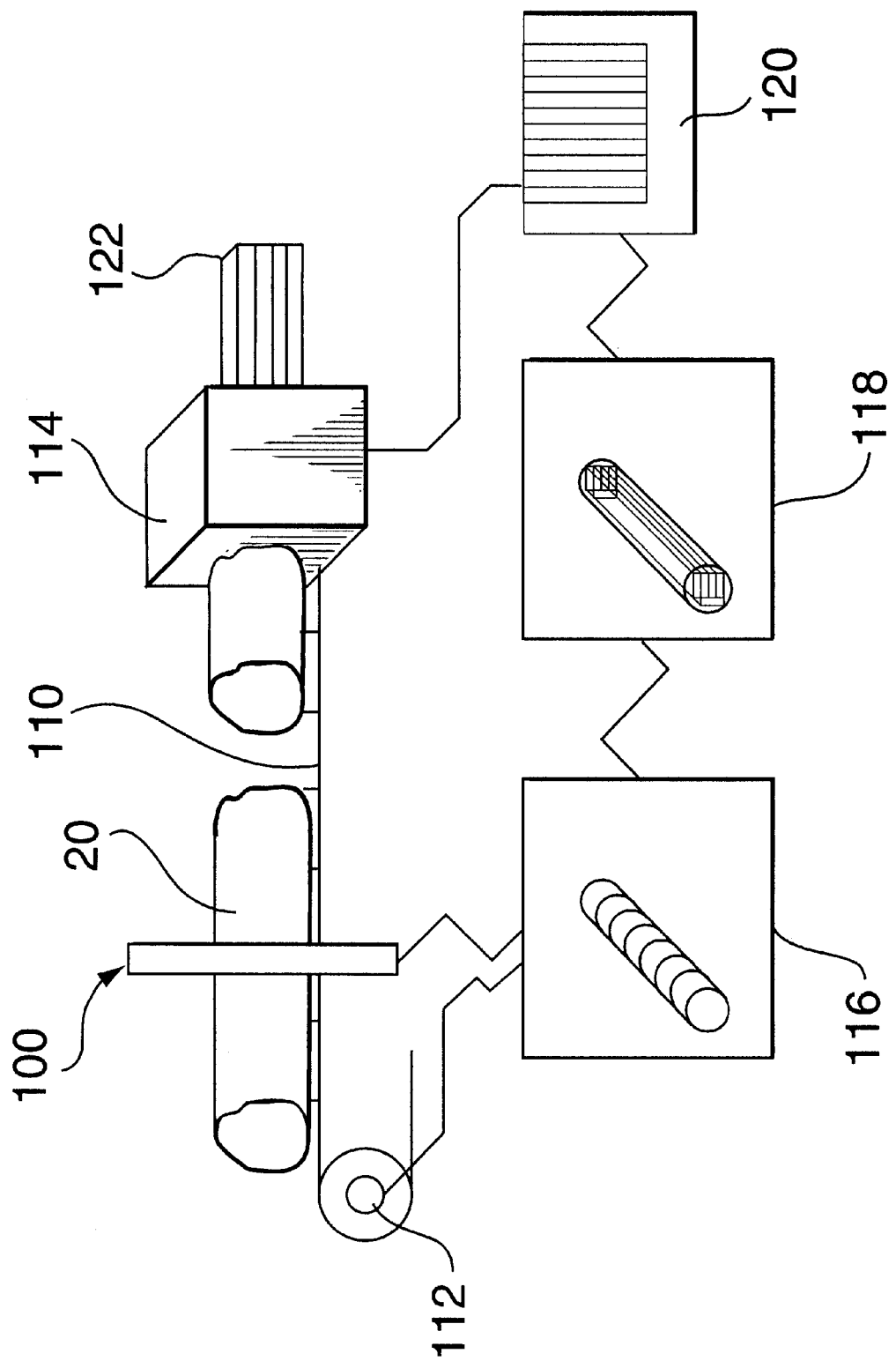
FIG. 14 is a combined schematic side elevation view and process diagram illustrating the installation of a preferred embodiment of the invention in a primary breakdown system in a saw mill.

In a typical saw mill application an array 100 of scanner heads 11 is used in the primary breakdown process illustrated schematically in FIG. 14. A log transport apparatus 110 moves the log 20 through the plane of the array 100 of scanner heads 11. The direction of motion of the log transport apparatus 110 is perpendicular to the plane of the array 100 of scanner heads 11 and may be conveniently considered the z-direction. The x and y directions are then in the plane of the array 100 of scanner heads 11 in which the scanner heads 11 project the coded beams 18. A shaft encoder 112 attached to the log transport apparatus 110 tracks the distance the log 20 moves, providing a z-coordinate for each line profile obtained by the scanner heads 11. Each scanner heads 11 provides a list of x,y coordinate pairs which, when combined with the z-coordinate obtained from the shaft encoder 112, enable a host computer 92 to construct a mathematical model 116 of the log 20, calculate an optimal cutting pattern 118, and issue commands to the primary breakdown unit 114 to set saws to cut the log 20 into optimally dimensioned slabs 122. Host computer 92 is not shown in FIG. 14; numerals 116, 118, and 120 indicate processing steps that takes place in host computer 92 using data obtained from the array 100 of scanner heads 11. A suitable host computer 92 is the conventional programmable logic controller (industrial computer) running log modelling, optimizing and primary breakdown controlling software available from MPM Engineering Limited, Langley, British Columbia or Porter Engineering Limited, Richmond, British Columbia.

Figure 11B:
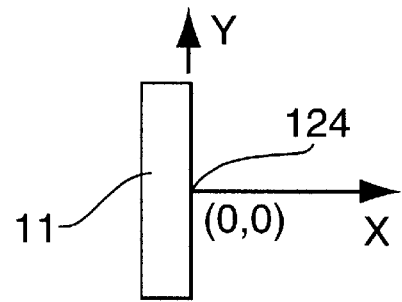
FIG. 11B is a schematic cross-sectional view of one of the scanner heads of FIG. 11A in the plane perpendicular to the axis of the log illustrating the orientation of the relative coordinate system of each scanner head of FIG. 11A.
Figure 11A:
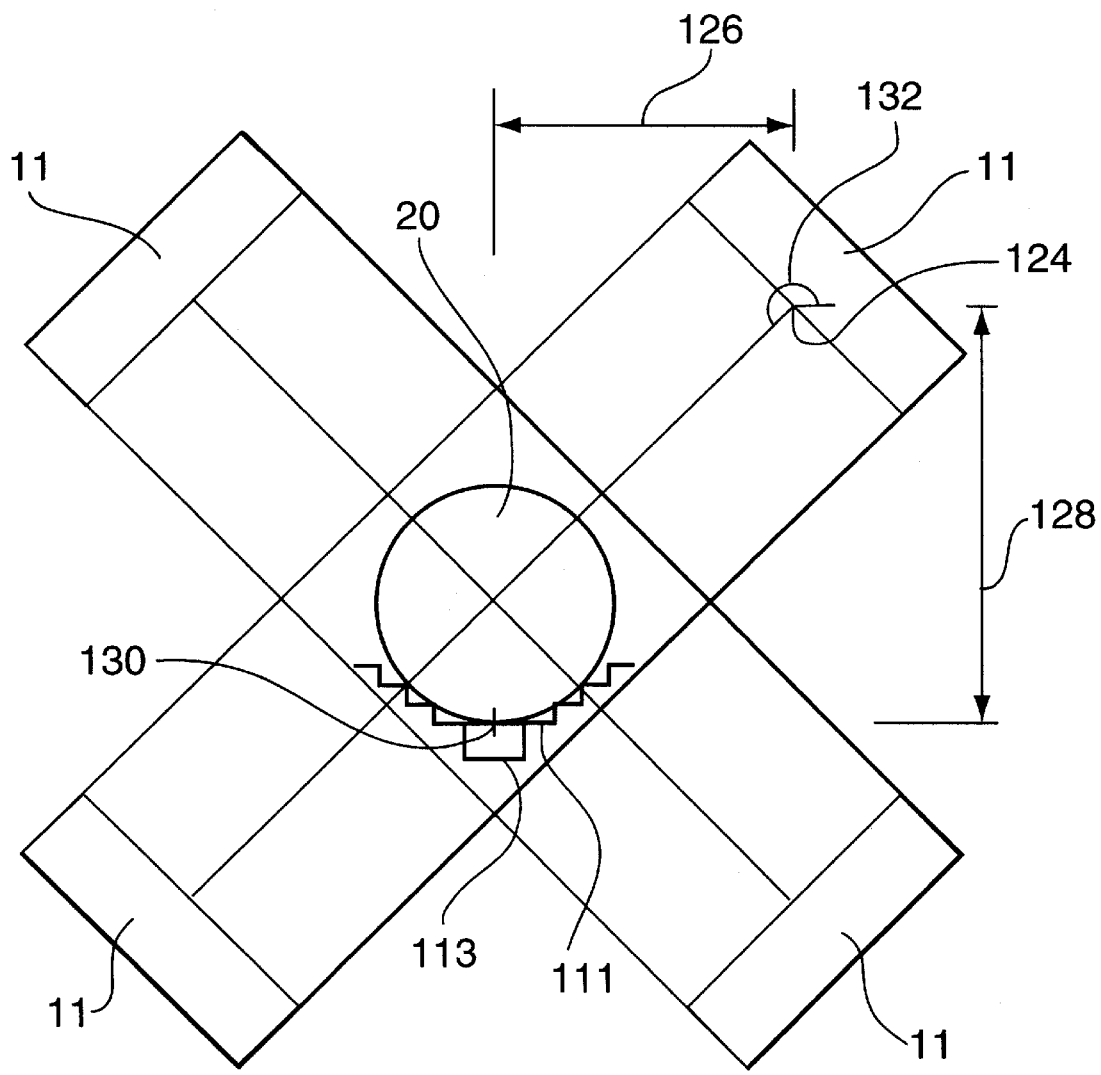
FIG. 11A is a schematic cross-sectional view of the array of scanner heads of FIG. 10 in a plane perpendicular to the axis of the log.
Figure 12A:
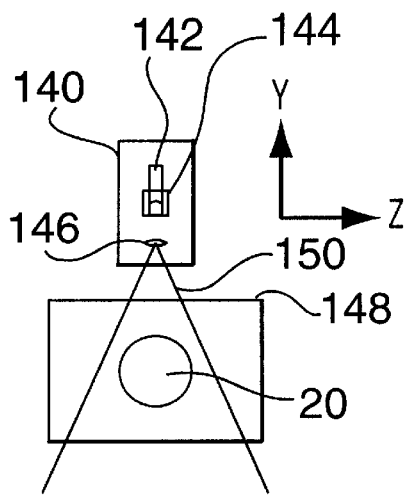
FIGS. 12A and 12B are, respectively, schematic end and side elevation views of a conventional sheet-of-light profile scanner known in the prior art.
Figure 12B:
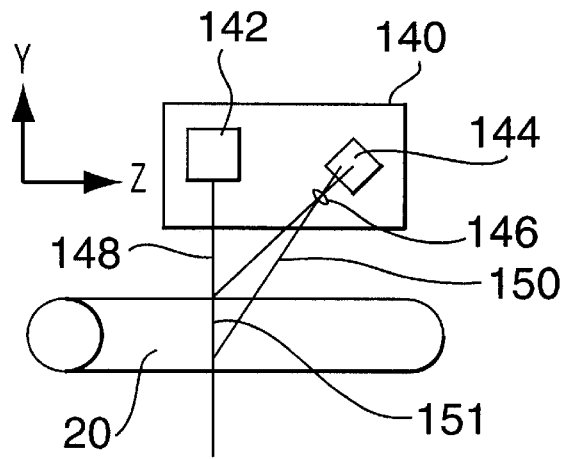

The scan zone configuration of the array 100 of scanners 11 is illustrated in more detail in FIGS. 11A and 11B. The list of x,y coordinates provided by a scanner head 11 to the host computer 92 is relative to the origin 124 of the coordinate system for that scanner 11 as shown in FIG. 11B. Each scanner head 11 is mounted in the frame 106 with its origin 124 at a preselected x and y offsets 126/128 from the centerline 130 of the log transport apparatus 106 and a preselected rotation angle 132 relative to the horizontal. Using conventional coordinate transformations the host computer 92 transforms and combines the sets of x,y coordinate pairs provided by the scanner array 100 into a single coordinate system thereby obtaining the coordinates of the entire surface of the log 20 relative to the log transport apparatus 106 by the time the log 20 has passed through the array 100. The manner of operation of the host computer is not part of the invention; the invention is for use with a host computer of conventional design and operation.

A laser light source 10 and a suitable cylindrical lens 12 within the housing 19 of profile scanner 11 produce a beamed sheet (fan) of light of generally uniform intensity across the angle of the sheet, generally indicated as 8. The beamed sheet 8 may be considered to be a two-dimensional sheet lying in the plane of FIG. 1 and having a very small dimension (approximately 0.04" for typical laser sources) perpendicular to the plane of FIG. 1. The beamed sheet 8 is reflected from mirror 14 and is thence transmitted through a mask 16 that encodes the beamed sheet 8 of light into a spatially varying pattern of beams 18 that is directed toward the object 20 (e.g., a log) to be measured. In the preferred embodiment illustrated here, the mask 16 is placed as far as possible from the cylindrical lens 12 for the purpose of minimizing the loss of pattern resolution on the object (log 20) being scanned that arises from diffraction of the beam 8 as it passes through the mask 16.

The angle P through which the beam 18 is projected should not be unduly large, because a large angle tends to entail an unacceptable degree of non-uniformity of size and resolution of pattern elements as projected onto the scanned object (here log 20). To some extent, such non-uniformity can be compensated for by transmitting the beam 8 through a mask 16 that is curved instead of straight, or by varying the relative size of pattern elements as one proceeds from the extremity to the centre of the pattern applied to the mask 16. However, it is preferable to provide several scanners each working in an acceptably small angular range rather than to use too wide a scanning beam 18.

A portion of the diffuse light reflected from the surface of the log 20 passes through a window 22 in profiler housing 19, is reflected by a mirror 24, and is focussed by an imaging lens 26 to form an image on the image sensor 28. The window 6 in which mask 16 is placed and the window 22 are the only windows in the otherwise closed profiler housing 19 which housing 19 is opaque to light. The sensor 28 preferably comprises a linear array of light detecting elements that lie in the same plane as the pattern of beams 18. In the embodiment illustrated, the image sensor 28 is preferably a linear array of charge coupled devices, referred to herein as the CCD array 28. By arranging the laser light source 10, the cylindrical lens 12, the mirrors 14 and 24, the mask 16, windows 6 and 22, the imaging lens 26, and the sensor 28 in the housing 19 as described, the housing 19 may be a compact flat box having little thickness in the direction perpendicular to the plane of a coded scanning beam 18. In the preferred embodiment of the invention illustrated in FIG. 1, the housing 19 is less than three inches thick in that direction. The profile scanner 11 will then have the advantages of a co-planar scanner discussed above when used in a saw mill environment.

Mirror 14 and mirror 24 allow the elements of the preferred embodiment illustrated here to fit inside a compact housing while maintaining the preferred spacing of the mask 16 and lens 12. It will be apparent to those skilled in optical design that the mirrors 14 and 24 are not essential to the system, but permit the transmitted and reflected light beams to be "folded" so as to permit the assembly of FIG. 1 to be more compactly designed than would be the case if such mirrors were not used. Further, the negative effects of diffraction of the light beam 8 as it passes through the mask 16 are minimized if the mask 16 is placed as close as possible to the log 20, and the mirror arrangement of FIG. 1 facilitates this objective.

Figure 4:
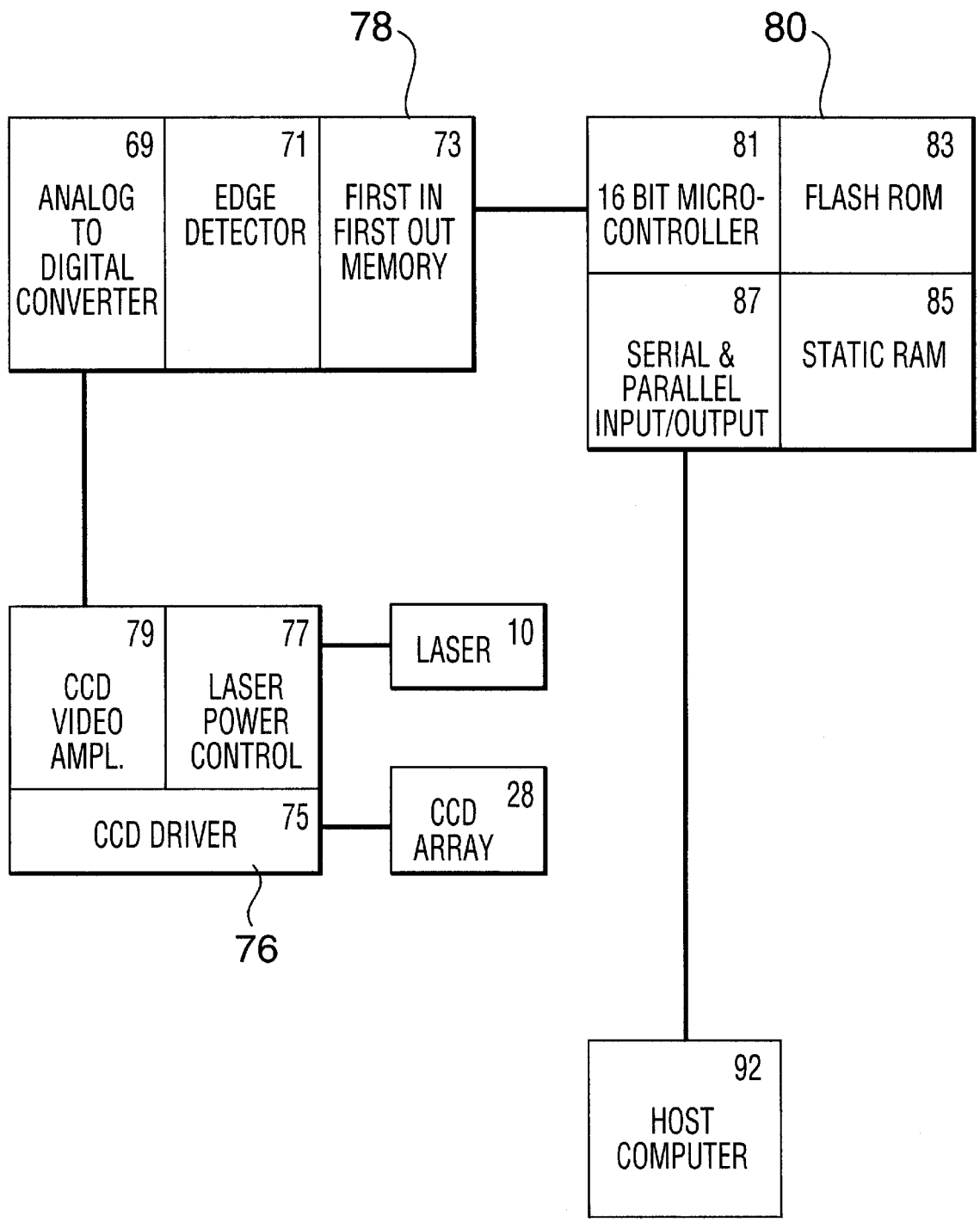
FIG. 4 is a schematic block diagram of an embodiment of signal processing and computational apparatus according to the invention for use in conjunction with the scanning and detection apparatus of FIG. 1.
Figure 5:
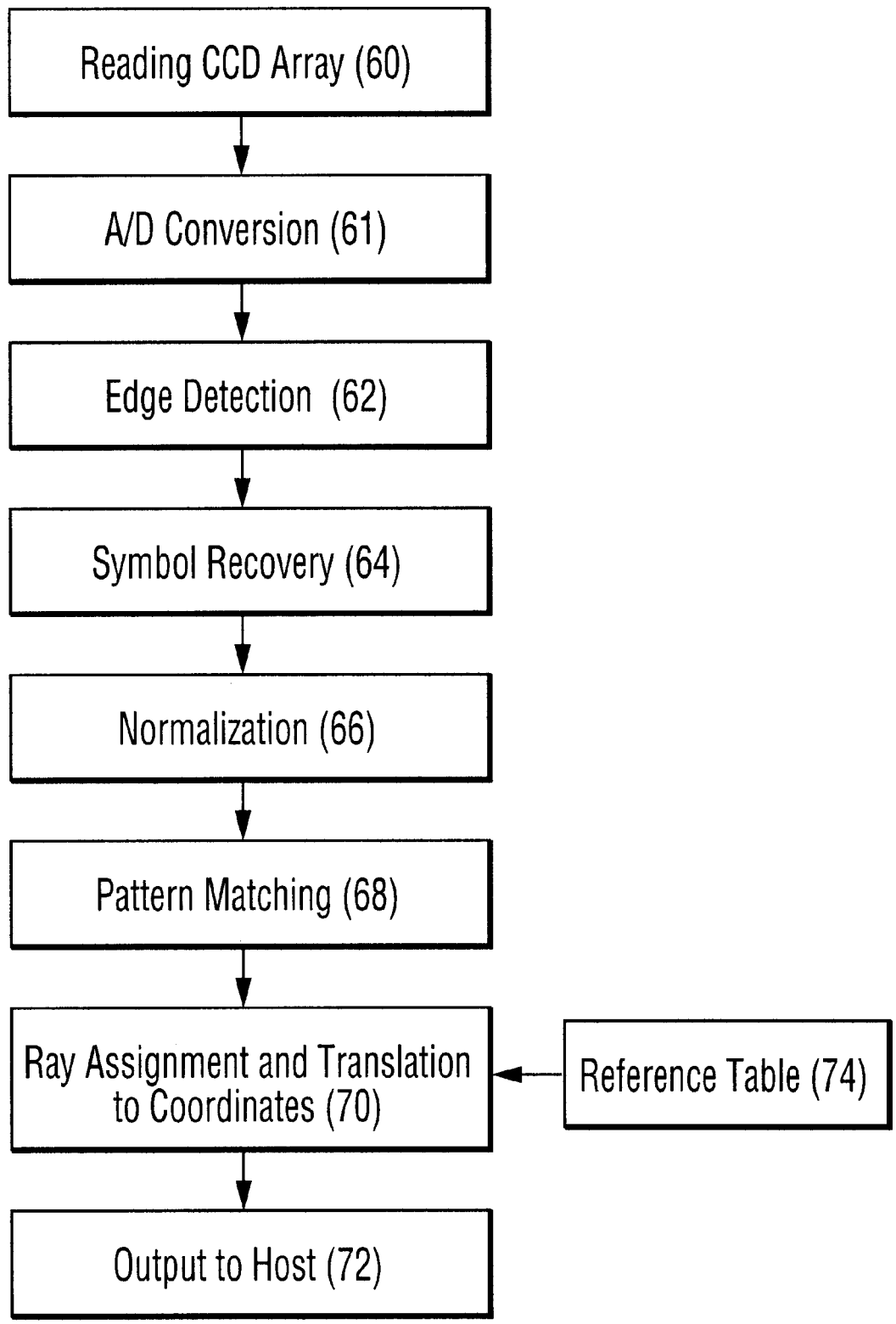
FIG. 5 is a flow chart depicting the flow of data through the signal processing and computational apparatus of FIG. 4.

The image data represented by the accumulated charges on the light sensitive elements (pixels) of the CCD array 28 is read out periodically (once after each scan) and the resulting signal processed by the signal processing apparatus shown schematically in FIG. 4 and operating functionally as represented in FIG. 5 (which structure and operation are described in detail below) to determine the profile of the object 20 lying in the plane of the transmitted encoded pattern of beam 18. Each individual scan gives a line profile of that portion of the object 20 lying in the pattern of beams 18 at any given time. As the object 20 moves past the optical profiler 11, a series of such line profiles generate a surface profile for that portion of the total surface of the object 20 that is scanned by the series of line scans. The signal processing apparatus preferably uses a triangulation technique to determine the coordinates of the regions (spots) of the surface of the object 20 on which each beam of light in the pattern of beams 18 falls.

The application of a suitable triangulation technique is possible because the laser light source 10, the cylindrical lens 12, the mirror 14, the mask 16, the mirror 24, the imaging lens 26, and the CCD array 28 (collectively referred to as the optical elements) are fixed in both orientation and position relative to each other. Once the signal processing apparatus of FIG. 4 identifies a first transmitted beam of light passing through a particular transparent section of the mask 16 with a second reflected beam of light falling on a particular pixel of the CCD array 28 (a process described in detail below), the coordinates of the point (spot) on the object 20 at which the first beam fell can be determined by ray tracing the optical path from the laser light source 10 to the CCD array 28.

Figure 2:
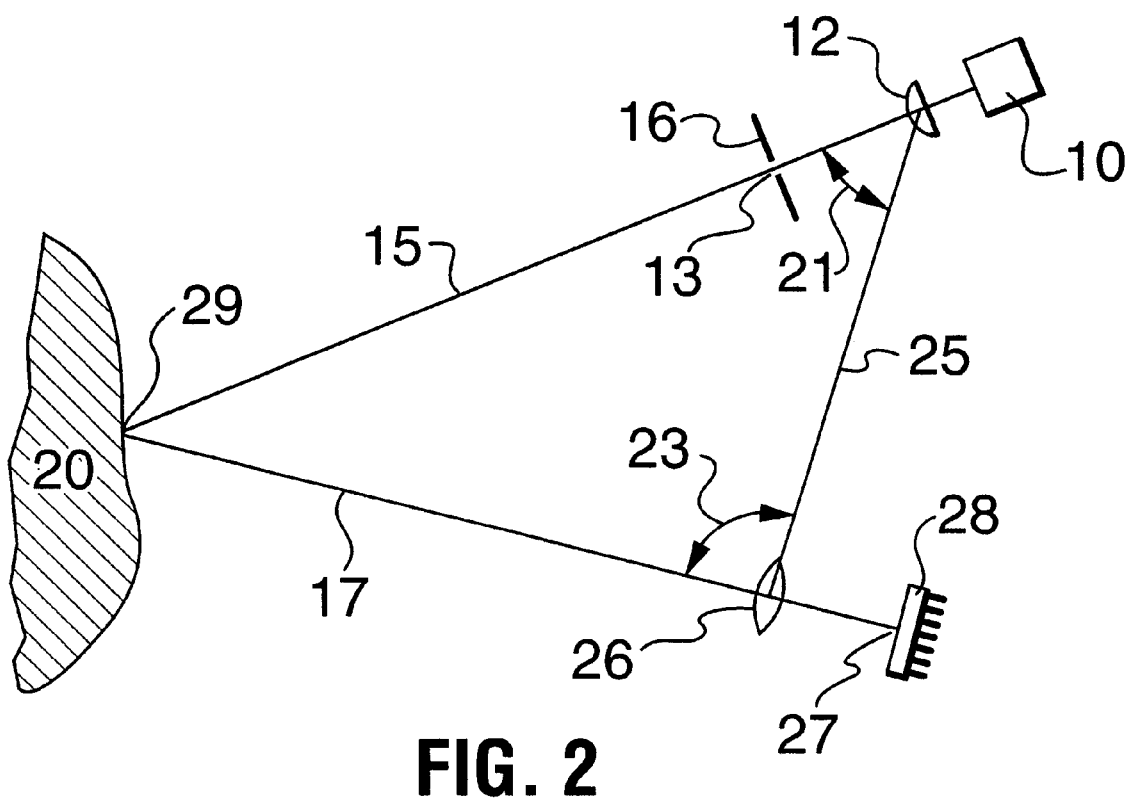
FIG. 2 is a schematic diagram showing the unfolded optical path of FIG. 1.

To understand the application of triangulation principles to the invention, consider unfolding the optical paths shown in FIG. 1 by removing the mirrors 14 and 24 and placing the laser light source 10 and cylindrical lens 12 and the imaging lens 26 and CCD array 28 at their respective virtual positions as illustrated in FIG. 2. If we consider a transmitted ray 15 of light passing through a particular transparent section 13 of the mask 16 and the corresponding reflected ray 17 from the object 20 that is detected by a particular pixel 27 of the CCD array 28, then triangulation can be applied to determine the coordinates of the point 29 at which the light ray 15 falls on the object 20 being measured. It can readily be seen that a triangle is formed by portions of:

(a) the incident light ray 15 that originates in the laser light source 10, passes through the cylindrical lens 12, the transparent section 13 of the mask 16, and intercepts the object 20 at point 29; and (b) the reflected light ray 17 that originates at point 29 on the object 20, passes through the imaging lens 26, and is detected by pixel 27 of the CCD array 28; and (c) the base line 25 from the cylindrical lens 12 to the imaging lens 26. (For simplicity, we have assumed that a particular ray falls on a-particular pixel, but a typical pattern element of a suitable coded pattern is likely to fall upon a contiguous series of pixels).

The angle 21 between ray 15 and line 25 is measured as part of the calibration of the optical profiler 11 for each transparent section 13 of a given mask 16. Similarly, the angle 23 between ray 17 and line 25 is either measured as part of the calibration of the optical profiler 11 or is found by interpolation from angles measured as part of the calibration for pixels near to pixel 27. Once a ray can be traced through a particular transparent section 13 of the mask 16 and correlated with its reflection from the object 20 to a particular pixel 27 of the CCD array 28, the two angles 21 and 23 are known from the calibration of the optical profiler 11, and the included side of the triangle base line 25 is fixed as part of the construction of the optical profiler 11, SQ that the distance from the imaging lens 26 or the cylindrical lens 12 to the point 29 on the object 20 can be found from elementary trigonometry, as can the coordinates of point 29 in any coordinate system fixed to the optical elements.

Figure 3:
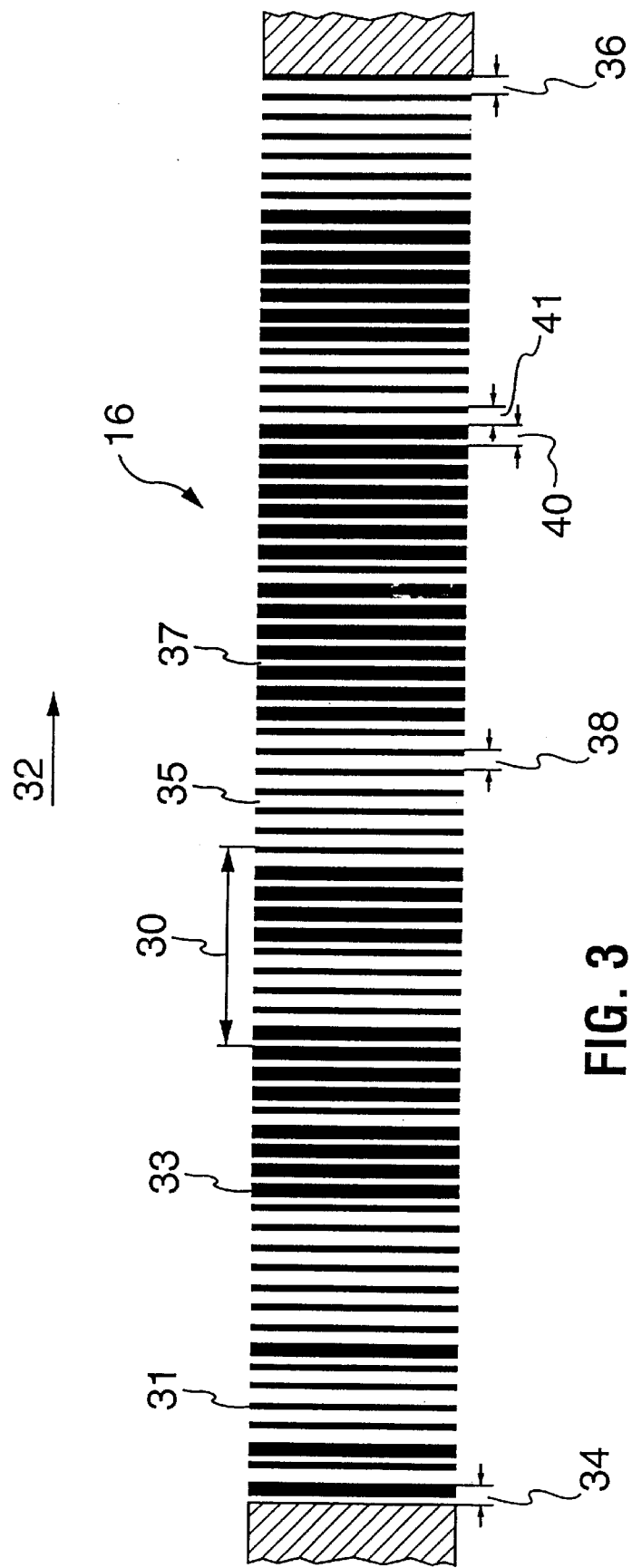
FIG. 3 is a sample mask according to the invention used to generate a suitable pattern of projected light for use in the apparatus of FIG. 1.

An example of a suitable mask 16 for use in the apparatus of FIG. 1 is shown in detail in FIG. 3. In the mask, which may be, for example, a strip of plastic, alternating transparent bands and opaque bands form a pattern. The opaque bands are either narrow bands 31 or wide bands 33. The transparent bands are either wide bands 35 or narrow bands 37. The combined width of an opaque band and the transparent band to its immediate left (as seen in FIG. 3) is constant.

For a complete description of a preferred embodiment of the mask 16 and the criteria for the design of the pattern used for the mask 16 the reader is referred to U.S. Pat. No. 5,615,003.

It is the purpose of the invention to make possible a correlation of the specimen signal read out of the CCD array 28 for the reflected light from the irregular surface of a particular test object 20 illuminated by light that has passed through the sample mask pattern shown in FIG. 3, with the features of the sample mask pattern shown in FIG. 3. The transmitted pattern in the pattern of beams 18 is of course determined by the pattern of light and dark bands in the mask 16. For the purpose of comparing the transmitted pattern with the received pattern, the transmitted pattern is divided into pattern elements each comprising a light (transparent) band and an adjacent dark (opaque) band immediately to its right (as seen in FIG. 3). These pattern elements can each be described as beginning with a rising edge (dark-to-light transition), followed by a falling edge (light-to-dark transition), followed by a second rising edge (dark-to-light transition), as one moves across the pattern of beams 18 transmitted at the object 20 being measured, in a left-to-right order with respect to FIG. 3.

The purpose of the receiving portion of the invention, including the imaging lens 26, the CCD array 28, and the signal processing circuitry described below, is to receive the reflected light, including the reflection of the pattern of beams of 18, from the object 20, and to analyzed the received signal from the CCD array 28 in such a manner as to correlate as many received pattern elements as possible with transmitted pattern elements. Once a received pattern element is correlated with a transmitted pattern element, the coordinates of the point on the object from which that pattern element was reflected can be determined by a straightforward triangulation method such as that described with reference to FIG. 2, because that received pattern element is then associated with a known ray of light that can be traced from the laser light source 10 through a particular transparent portion of the mask 16 a determinable spot on the scanned object 20 and thence by reflection to a particular pixel element of the CCD array 28.

In a preferred embodiment of the invention, the signal and data processing apparatus for processing the received signal in the CCD array 28 is schematically illustrated in FIG. 4 and consists of three (say) printed circuit boards 76, 78, and 80 constructed out of readily available off-the-shelf components familiar to those skilled in the art. Printed circuit board 76 contains the power control circuitry 77 for the laser light source 10, and also contains the CCD driver 75 and CCD video amplifier 79 for reading out the voltages accumulated on the light-sensitive pixel elements of the CCD array 28 and for amplifying the signal consisting of the pixel sequence of those voltages. Printed circuit board 78 is constructed of discrete components and programmable logic arrays and consists of an analog-to-digital converter 69, edge detector 71, and first-in first-out memory 73. Printed circuit board 80 is a central processing unit consisting of a microcontroller 81, flash read-only memory 83, static random access memory 85, and serial and parallel input/output circuits 87.

The apparatus schematically illustrated in FIG. 4 processes the received signal to correlate received pattern elements with transmitted pattern elements in accordance with the overall process shown functionally in FIG. 5. Each part of the overall process shown in FIG. 5 takes place in portions of the apparatus illustrated in FIG. 4 as described in the following discussion.

The signal read 60 from the CCD array 28 by the CCD driver 75 and amplified by the CCD video amplifier 79 undergoes digitization 61 in the analog-to-digital converter 69. The resulting signal is the set of the intensities of the light falling at locations (pixel addresses) along the image that was formed on the CCD array 28 by the imaging lens 26. The signal then undergoes edge detection 62 in the edge detector 71 to find the pixel addresses at which the intensity of the light falling on the CCD array 28 rises and falls. The edge detector 71 uses conventional methods to differentiate and smooth the signal and then to detect peaks in the result.

Figure 6:
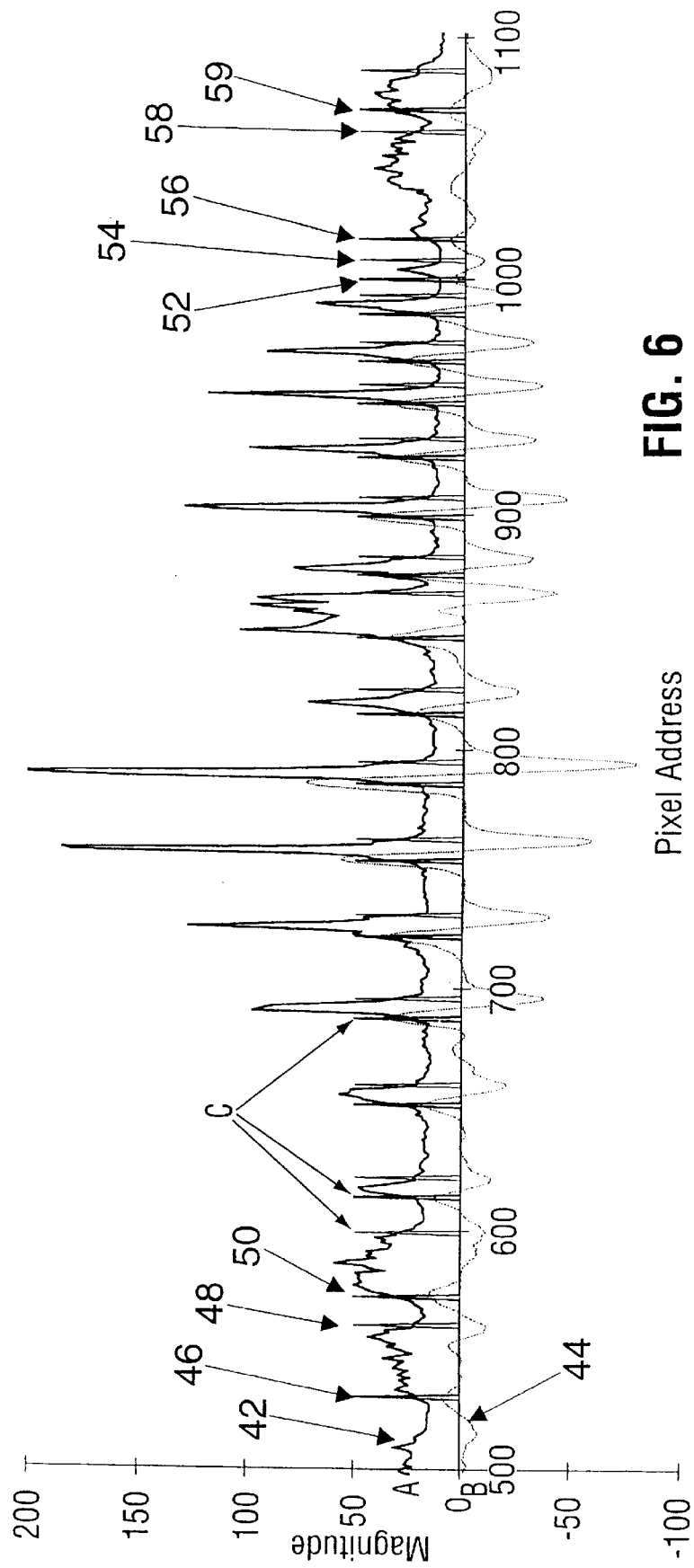
FIG. 6 is a graph depicting the processing of a sample of data, at three stages in the signal processing viz.: the raw signal amplitude; the amplitude of the processed signal after the raw signal has passed through a suitable differentiator and a noise reduction filter; and the edge detector output signal, for a specimen reflected signal generated by the scanning and detection apparatus of FIG. 1 using the mask shown in FIG. 3 and a test object.

FIG. 6 illustrates the processing carried out by the edge detector 71 as applied to the received signal corresponding to the portion of the transmitted signal originating from the portion of the mask shown in FIG. 3 from the mark of pattern element 38 to the mark of pattern element 41. The magnitude of the raw received signal 42 from the CCD array as a function of the pixel address (position on the CCD array) is plotted as a dark solid line in FIG. 6. In FIG. 6 the differentiated and smoothed received signal 44 is plotted as a light dotted line. Spikes, of which spikes 46, 48, 50, 52, 54, 56, 58, and 59 are examples, are plotted at the maxima and minima of the differentiated and smoothed received signal 44. The spikes are plotted at pixel addresses at which the received signal increases or decreases suddenly, i.e., edges of the marks and spaces of received pattern elements.

The mark of pattern element 38 (FIG. 3) corresponds to the received signal between edge 46 and edge 48. The space of pattern element 38 corresponds to the signal between edge 48 and edge 50. The mark of pattern element 40 of the mask 16 (FIG. 3) can be seen to correspond to the received signal between edge 52 and edge 54. The space of pattern element 40 corresponds to the received signal between edge 54 and edge 56. (Note that in the exemplary received signal of FIG. 6, the edge detector 71 encountered difficulties between edge 56 and edge 58, missing a falling and a rising edge, because the differentiated and smoothed signal 44 between edge 56 and edge 58 was less than the threshold for reliable edge detection. The threshold level is set by testing without the mask 16 in the window 6 to determine the noise level. The threshold is set accordingly.)

Note that, as in the case of any other system in which data are communicated, the system designer has the choice of attempting to capture all available information from the data at the risk of increased noise, or maintaining a detection threshold at a relatively high level to reject all or most noise, at the risk of failing to capture some information from the data. Again, an empirical approach is preferred, to balance the desiderata of information capture and noise suppression.

The edge detector 71 stores the pixel addresses and the direction (rising of falling) of each edge in the received signal in the first-in-first-out memory 73 to be read by the micro-controller 81 when the micro-controller 81 is ready to process the scan represented in FIG. 6.

Referring to FIG. 5, the first three functions (reading step 60, analog-to-digital conversion 61, and edge detection 62) have already been discussed. The functions symbol recovery 64, normalization 66, pattern matching 68, and ray-assignment-and-translation-to-coordinates 70 are performed by the micro-controller 81 (FIG. 4) using software and calibration data stored in the flash read-only memory 83.

The duty cycle of a pattern element is the portion that the mark of the pattern element (measured in number of consecutive pixels) is, in width, of the width (again measured in number of consecutive pixels) of the pattern element containing the mark. The normalization routine 66 involves the calculation of the apparent duty cycle of each received pattern element by dividing the difference in pixel addresses of the rising and falling edges of the mark of the received pattern element, by the difference in the pixel addresses of the rising edges that constitute the beginning and end of the received pattern element. This is illustrated in FIG. 6 for the pattern element received that corresponds to the transmitted pattern element 38 shown in FIG. 3. Suppose, for example, that the pixel address of edge 50 is 574, that of the edge 46 is 525, and that of the edge 48 is 560. The duty cycle of the received pattern element from edge 46 to edge 50 is then:

$$\frac{560 - 525}{574 - 525} = \frac{35}{49} = 0.71$$

The duty cycles of all transmitted pattern elements are determined by the design of the mask shown in FIG. 3 and are, in the illustrated embodiment, either $\frac{1}{3}$ or $\frac{2}{3}$.

The calculated values of duty cycles for received pattern elements will be variable due to the curvature of the surface of the object 20. The duty cycles of the received pattern elements corresponding to the portion of the transmitted signal from the mark 38 to mark 41 in FIG. 3 are plotted as bars in FIG. 7. For example, the received pattern element corresponding to transmitted pattern element 38, which in FIG. 6 is the signal from edge 46 to edge 50, has a duty cycle represented by the duty cycle bar 82 in FIG. 7. Similarly, the duty cycle of the received pattern element corresponding to transmitted pattern element 40, which received pattern element in FIG. 6 is the signal from edge 52 to edge 56, is represented by the duty cycle bar 84 in FIG. 7.

Figure 7:
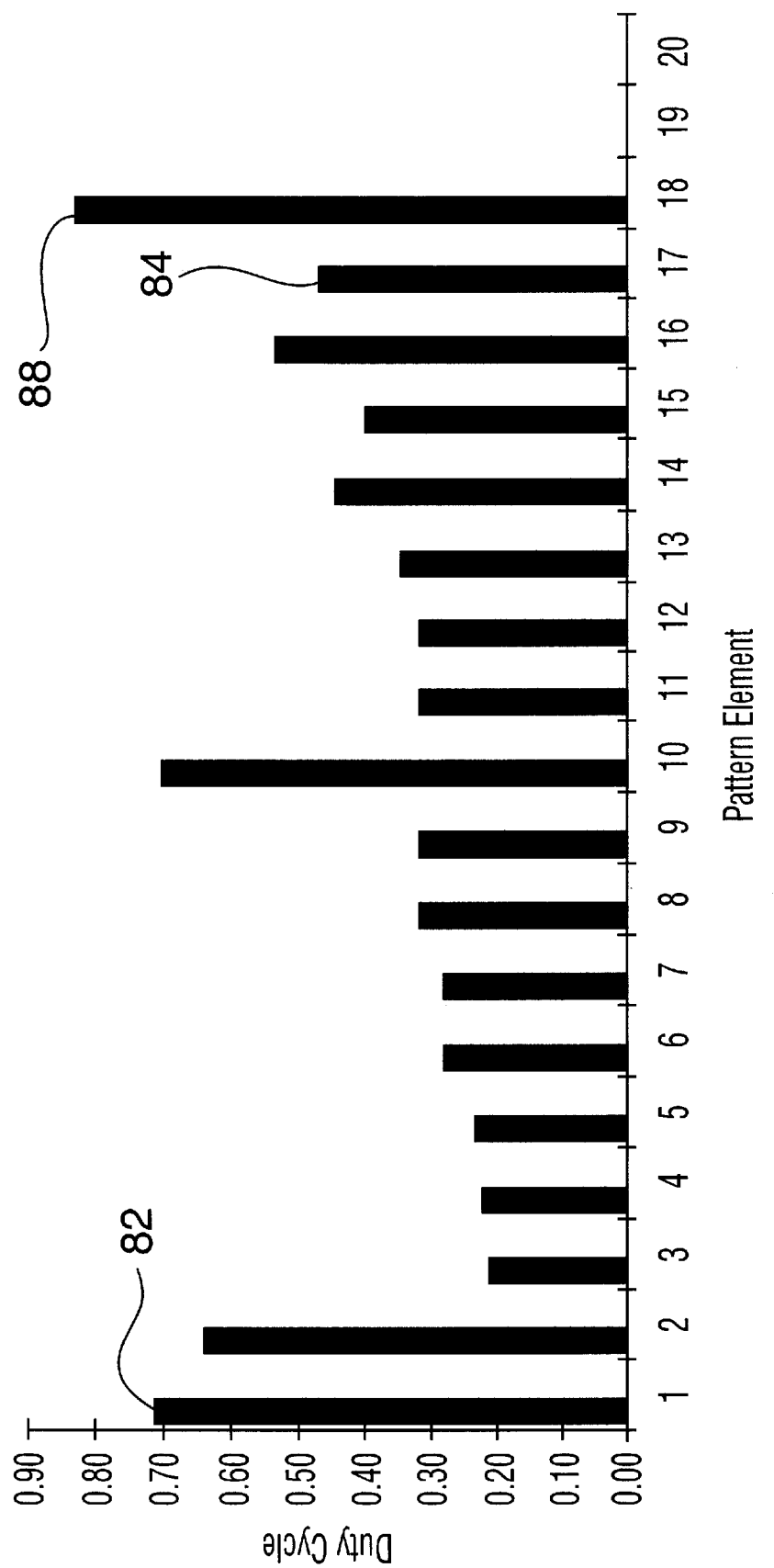
FIG. 7 is a bar graph showing duty cycles corresponding to the sample received data shown in FIG. 6, determined from the edge detector output of the edge detector of FIG. 4.

Before the pattern matching routine 68 and the ray-assignment-and-translation-to-coordinates routine 70 can be employed, the received signal pattern of duty cycles plotted in FIG. 7 is only known to correspond to some as-yet-undetermined portion of the mask pattern shown in FIG. 3, and thus to some as-yet-undetermined portion of the object 20 being scanned. A human operator might be able to see the correspondence between the received signal pattern and transmitted signal pattern easily from inspection of FIG. 3 and FIG. 7, but in a practical application, the correspondence must be found almost instantly by the signal processing apparatus, which necessitates a mathematical approach. To find which portion of the transmitted pattern corresponds to the received pattern plotted in FIG. 7, the pattern matching routine 68 is employed to attempt to fit the duty cycle pattern plotted in FIG. 7 to some determinable portion of the known duty cycle pattern of the entire transmitted signal. The duty cycle values for the transmitted pattern elements found in the mask shown in FIG. 3 are shown in FIG. 9 as a sequence of open bars, and the received duty cycle pattern is shown as a sequence of solid bars.

Figure 8:
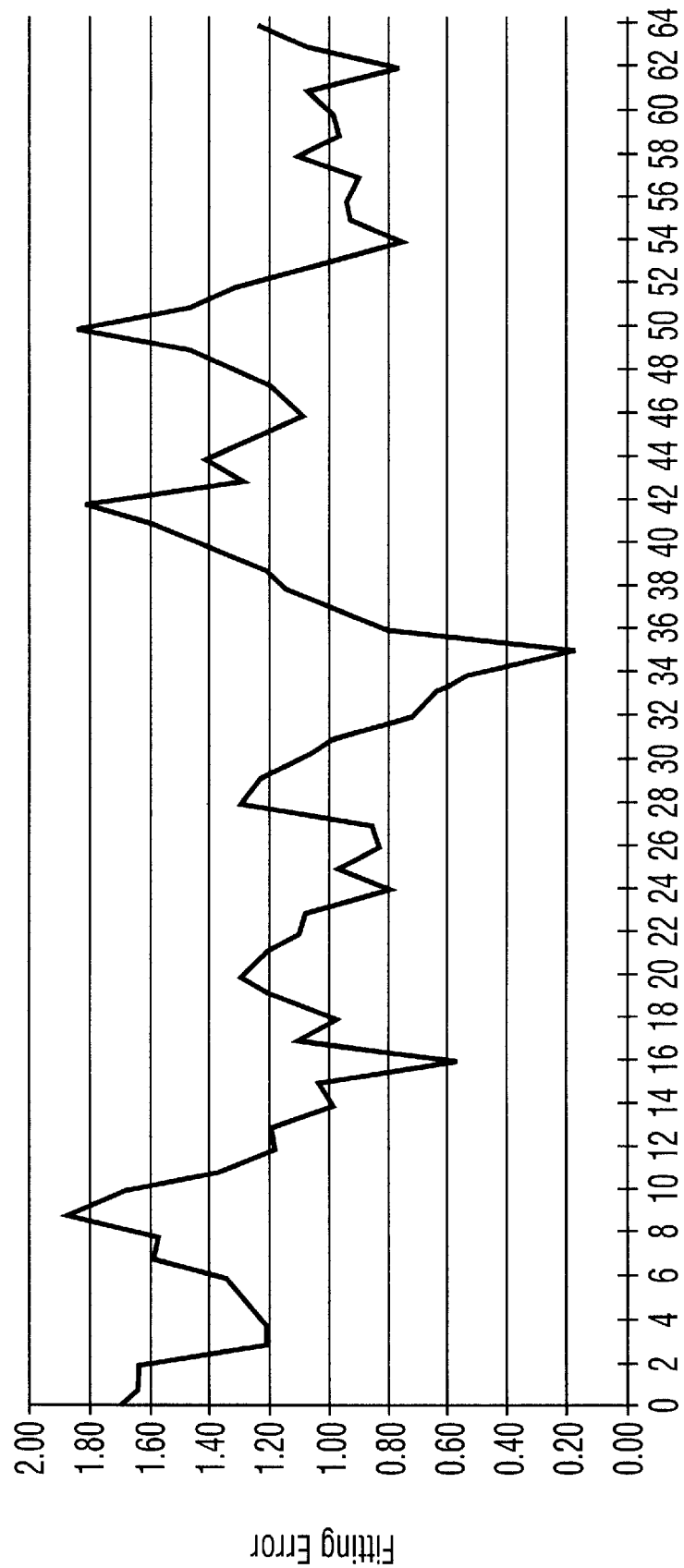
FIG. 8 is a graph showing the fitting error, calculated by a least squares technique, of the fit of the received pattern of the duty cycles shown in FIG. 7 to the transmitted pattern of duty cycles of the transmitted signal corresponding to the mask shown in FIG. 3, as a function of the offset between the first duty cycle of the pattern of duty cycles shown in FIG. 7 and the first duty cycle of the pattern of duty cycles of the transmitted-signal corresponding to the mask shown in FIG. 3.
Figure 9:
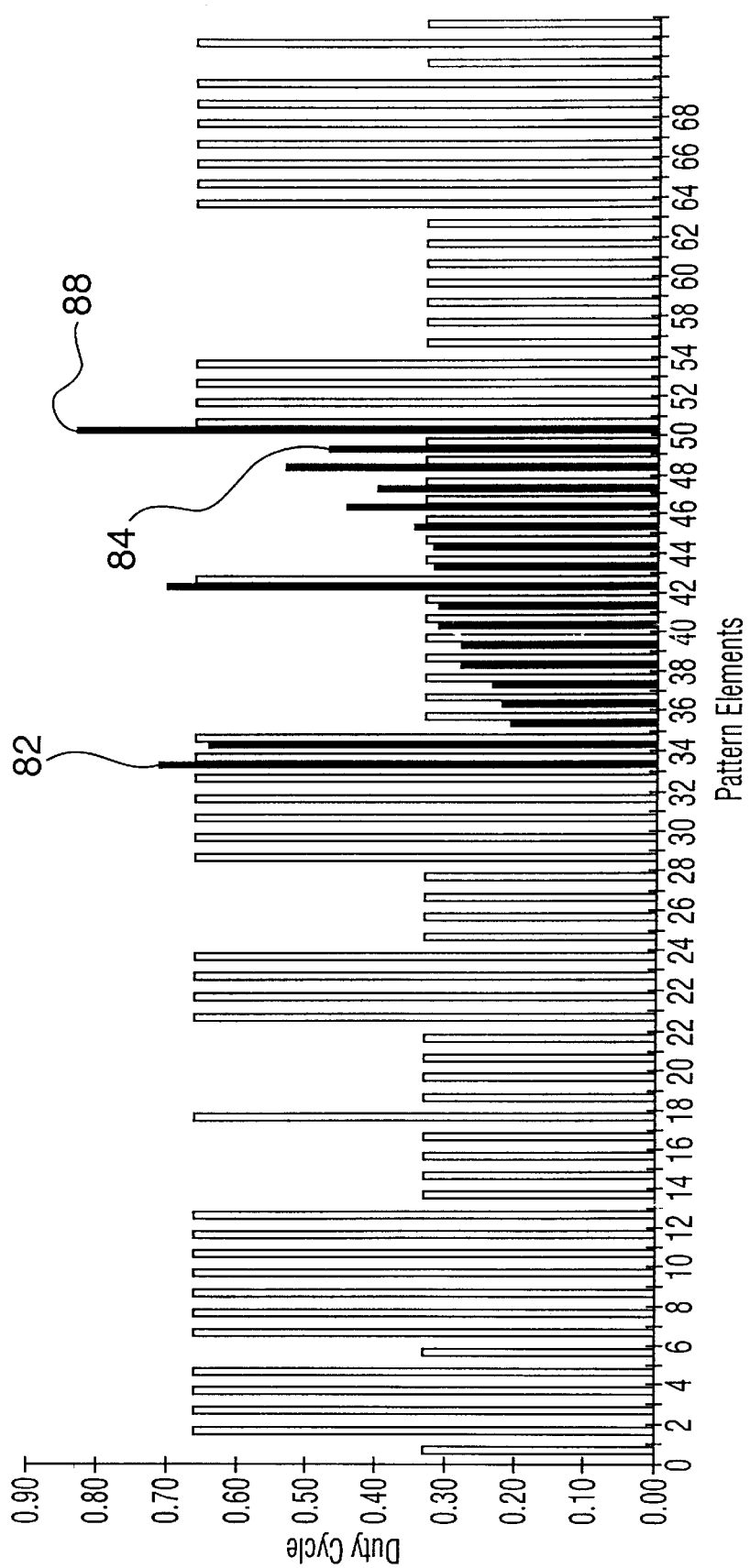
FIG. 9 is a bar graph showing the duty cycles shown in FIG. 7 superimposed upon the transmitted duty cycle pattern (shown as open bars), corresponding to the mask shown in FIG. 3, at the matching of best fit as determined from the data presented in FIG. 8.

In the illustrative example, to obtain the best fit, the micro-controller 81, using the pattern matching routine 68, attempts to match the received pattern of the 18 duty cycle values plotted in FIG. 7 to each possible sequence of 18 duty cycle values in the sequence of 72 duty cycle values for the transmitted signal shown in FIG. 9 as open bars. At each offset of the first duty cycle of the received pattern from the first duty cycle of the transmitted sequence, the micro-controller 81, using the pattern matching routine 68, calculates a measure of the closeness of the fit (the fitting error) by summing the squares of the differences between the duty cycle values of the received pattern and the subsequence of the transmitted signal being tested. Specifically, the difference between the first duty cycle of the received pattern and the first duty cycle of the subsequence of the transmitted signal being tested is squared and added to the square of the difference between the second duty cycle of the received pattern and the second duty cycle of the subsequence of the transmitted signal being tested, and so forth. The fitting error for the illustrative example is plotted in FIG. 8 as a function of the offset between the first duty cycle of the received pattern and the first duty cycle of the transmitted signal pattern. The smallest fitting error occurs at an offset of 35 pattern elements, indicating that the received pattern corresponds to a portion of the transmitted signal commencing at the 35th pattern element. The fit of the received pattern shown in FIG. 7 to the transmitted pattern obtained from the use of the mask illustrated in FIG. 3 that is obtained by this procedure is shown in FIG. 9. The black bars represent the received pattern shown in FIG. 7 and the open bars, the transmitted pattern obtained from the use of the mask shown in FIG. 3. (This "least squares" approach to correlation of received signal with transmitted signal is a preferred approach, but not the only possible approach. For example, the pairs of duty cycle values, referred to in the description of the least squares method above, could be multiplied together rather than the differences taken and then added together, in a process sometimes referred to as convolution. As another example, a human operator could, albeit slowly, monitor the two patterns and make a visual determination of the best fit.)

Each pattern element of the transmitted signal pattern can be correlated with a known ray (beam) of light of width just sufficient to include such pattern element, that has passed through the mask 16 shown in FIG. 3. The mark of the pattern element will have passed through a known transparent band of the mask 16. Therefore, once the offset from the scan limit at which a received pattern of duty cycle values best fits the duty cycle values of the pattern element transmitted signal is found, each mark of that received pattern can be assigned to a unique ray of light that passed through a now-known transparent band of the mask 16. In calibrating the apparatus of FIG. 4, a reference table 74 (FIG. 5) is preferably used that provides the set of the angles with respect to the mask 16 and the CCD array 28 at which a beam would fall on the object 20 for each possible combination of transmitted pattern element and received pattern element pixel address on the CCD array 28. The coordinate assignment routine 70 uses the reference table 74 to assign coordinates to each pattern element of each received pattern on the surface of the object 20 being scanned.

Finally, the output routine 72 (FIG. 5) converts the coordinates of the profile of the object 20 being scanned into a form that can be transferred as serial or parallel data to the host computer 92 (FIG. 4) for further use. The input/output hardware on printed circuit board 80, in addition to carrying out output routine 72, preferably also provides input capability to allow the host computer 92 to request the next set of data for determination of the next profile in the set of profiles to be determined, which when combined, provide surface coordinate information for the entirety of the surface of the scanned object (e.g. log 20) within the field of view of the profile scanner 11.

The symbol recovery function 64 shown in FIG. 5 is an optional feature that a person skilled in the art might wish to add to the embodiment of the invention described above to allow measurement of the surface of the scanned object under adverse conditions. Under adverse conditions, poor surface characteristics (e.g., variations in reflectivity) of the object being measured or other problems may cause the received signal to be too weak or too noisy at some pixel addresses to enable the edge detector 71 to correctly identify rising or falling edges (thereby causing edge data to be missing or spurious edge data to be produced by the edge detector 71). For a complete description of the symbol recovery function 64 the reader is referred to U.S. Pat. No. 5,615,003.

Variants within the scope of the invention will be readily apparent to those skilled in the technology. The scope of the invention is defined by the claims and is not intended to be limited by the foregoing description of a preferred embodiment.

What is claimed is:
1. A co-planar profile scanner, comprising:
   (a) an illuminator for illuminating a portion of the surface of an object along the line of intersection of a plane with the object by projecting in the plane onto the surface of the object a spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information;
   (b) a detector for receiving electromagnetic radiation reflected in the plane from the illuminated portion of the object;
   (c) a converter for converting the received electromagnetic radiation into reflection data;
   (d) a discriminator for processing said reflection data for correlating each distinguishable portion of the projected pattern with its reflection by comparing transmission data representing the pattern of the illuminating beam with the reflection data, so as to establish a match of an identifiable portion of the reflected radiation and a corresponding portion of the illuminating beam, whereby the portion of the surface of the object from which the reflected radiation has been reflected is ascertained; and
   (e) a coordinate calculator for computing the spatial coordinates of the portion of that surface of the object on which each distinguishable portion of the pattern falls.

2. The co-planar profile scanner as defined in claim 1, wherein the converter converts the received electromagnetic radiation into computer-readable digital reflection data.

3. The co-planar profile scanner as defined in claim 1, wherein the pattern is comprised of a plurality of parallel bands alternating between high and low intensity, the bands each having a selected one of at least two mutually distinguishable widths.

4. The co-planar profile scanner as defined in claim 3, wherein the pattern elements are arranged in a sequence that can be represented by a binary number comprising 1's and 0's, where each 0 represents a narrow high-intensity band followed by a wide low-intensity band, and each 1 represents a wide high-intensity band followed by a narrow low-intensity band, and where any sequence of 1's and 0's greater in length than a predetermined sequence is unique.

5. A co-planar profile scanner, comprising:
   (a) an illuminator for illuminating a portion of the surface of an object along the line of intersection of a plane with the object by projecting in the plane onto the surface of the object a spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information;

(b) means for forming an image of the illuminated portion of the object from the electromagnetic radiation reflected in the plane from the object;

(c) means for correlating the projected pattern with the image, so as to establish a match of each identifiable portion of the reflected radiation with a corresponding portion of the projected pattern, whereby the portion of the surface of the object from which the reflected radiation from the corresponding portion of the projected pattern has been reflected is ascertained; and (d) a coordinate calculator for computing the spatial coordinates of the portion of that surface of the object on which each distinguishable portion of the projected pattern falls.

6. The co-planar profile scanner as defined in claim 5, wherein the pattern is comprised of a plurality of parallel bands alternating between high and low intensity, the bands each having a selected one of at least two mutually distinguishable widths.

7. The co-planar profile scanner as defined in claim 6, wherein the pattern elements are arranged in a sequence that can be represented by a binary number comprising 1's and 0's, where each 0 represents a narrow high-intensity band followed by a wide low-intensity band, and each 1 represents a wide high-intensity band followed by a narrow low-intensity band, and where any sequence of 1's and 0's greater in length than a predetermined sequence is unique.

8. A co-planar profile scanner, comprising:
a frame surrounding a planar scan zone through which an object whose profile is to be measured may pass; and
at least three scanning heads mounted to the frame and approximately uniformly angularly spaced about the center of the scan zone,
each discrete scanning head having
an illuminator for illuminating a portion of the surface of the object along the line of intersection of the plane which includes the scan zone with the object by projecting in the plane toward the scan zone and onto the surface of the object a spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information, and
a detector for receiving electromagnetic radiation reflected in the plane which includes the scan zone from the illuminated portion of the object, and
each discrete scanning head further being associated with and connected to
a converter for converting the received electromagnetic radiation into reflection data,
a discriminator for processing said reflection data for correlating each distinguishable portion of the projected pattern with the image of its reflection by comparing transmission data representing the pattern of the illuminating beam with the reflection data, so as to establish a match of an identifiable portion of the reflected radiation and a corresponding portion of the illuminating beam, whereby the portion of the surface of the object from which the reflected radiation has been reflected is ascertained, and
a coordinate calculator for computing the spatial coordinates of the portion of that surface of the object on which each distinguishable portion of the pattern falls.

9. The co-planar profile scanner as defined in claim 8, comprising at least four scanning heads.

10. The co-planar profile scanner as defined in claim 8, wherein the converter converts the received electromagnetic radiation into computer-readable digital reflection data for processing in the discriminator.

11. The co-planar profile scanner as defined in claim 8, wherein the pattern is comprised of a plurality of parallel bands alternating between high and low intensity, the bands each having a selected one of at least two mutually distinguishable widths.

12. The co-planar profile scanner as defined in claim 11, wherein the pattern elements are arranged in a sequence that can be represented by a binary number comprising 1's and 0's, where each 0 represents a narrow high-intensity band followed by a wide low-intensity band, and each 1 represents a wide high-intensity band followed by a narrow low-intensity band, and where any sequence of 1's and 0's greater in length than a predetermined sequence is unique.

13. The co-planar profile scanner as defined in claim 12, wherein each discrete scanning head has a discrete converter, a discrete discriminator, and a discrete coordinate calculator.

14. A co-planar profile scanner for measuring an object by measuring the spatial coordinates of the line of intersection of a plane with the surface of the object, comprising (a) an illuminator for illuminating a portion of the surface of the object along the line of intersection of the plane with the object by projecting in the plane onto the surface of the object a coded spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information;

(b) a detector for receiving electromagnetic radiation reflected in the plane from the illuminated portion of the object;

(c) a converter for converting the received electromagnetic radiation into computer-readable digital reflection data;

(d) a discriminator for processing said data for correlating each distinguishable portion of the projected pattern with its reflection by comparing transmission data representing the pattern of the illuminating beam with the reflection data, so as to establish a match of an identifiable portion of the reflected radiation and a corresponding portion of the illuminating beam, whereby the portion of the surface of the object from which the reflected radiation has been reflected is ascertained; and (e) a coordinate calculator for computing the spatial coordinates of the portion of that surface of the object on which each distinguishable portion of the pattern falls.

15. The co-planar profile scanner as defined in claim 14, additionally comprising means for coordinating the illuminator, the detector, the converter, the discriminator, and the coordinate calculator to perform a series of scans of the surface of the object by measuring the spatial coordinates of lines of intersection of a series of discrete planes with the surface of the object, thereby to measure the coordinates of the surface of the object.

16. The co-planar profile scanner as defined in claim 15, wherein the illuminating means comprises a laser light source, a cylindrical lens receiving light from the laser light source and generating therefrom a fan-shaped beam of light, and a mask having said pattern created therein by means of alternating transparent and opaque regions, said mask receiving the fan-shaped beam of light from the cylindrical lens and superimposing the pattern on the beam as the beam passes through the mask.

17. The co-planar profile scanner as defined in claim 14, wherein the pattern is comprised of a plurality of parallel bands each band having a selected one of at least two mutually distinguishable intensities.

18. The co-planar profile scanner as defined in claim 14, wherein the pattern is comprised of a plurality of parallel bands alternating between high and low intensity, the bands each having a selected one of at least two mutually distinguishable widths.

19. The co-planar profile scanner as defined in claim 18, wherein the pattern elements are arranged in a sequence that can be represented by a binary number comprising 1's and 0's, where each 0 represents a narrow high-intensity band followed by a wide low-intensity band, and each 1 represents a wide high-intensity band followed by a narrow low-intensity band, and where any sequence of 1's and 0's greater in length than a predetermined sequence is unique.

20. The co-planar profile scanner as defined in claim 14, wherein the pattern is comprised of a plurality of parallel bands of alternating high and low intensity and a selected one of at least two mutually distinguishable widths, so arranged that when read from one end of the pattern, the pattern comprises elements each comprising a high intensity band and a following low intensity band.

21. A method for measuring an object by measuring the spatial coordinates of the line of intersection of a plane with the surface of the object, comprising the steps of:

(a) illuminating the surface of the object along the line of intersection of the plane with the object by projecting in the plane onto the surface a spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information;

(b) detecting electromagnetic radiation reflected in the plane from the illuminated portion of the object;

(c) converting the received electromagnetic radiation into computer-readable digital reflection data;

(d) correlating each distinguishable portion of the projected pattern with the image of its reflection by comparing transmission data representing the pattern of the illuminating beam with the reflection data, so as to establish a match of an identifiable portion of the reflected radiation and a corresponding portion of the illuminating beam, whereby the portion of the surface of the object from which the reflected radiation has been reflected is ascertained; and (e) computing the spatial coordinates of the portion of that surface of the object on which each distinguishable portion of the pattern falls.

22. The method defined in claim 21, wherein the surface of the object is measured by moving the object relative to the plane and repeating steps (a) through (e).

* * * * *